(12) United States Patent
Komuro

(10) Patent No.: US 8,634,017 B2
(45) Date of Patent: Jan. 21, 2014

(54) FOCUS DETECTION APPARATUS, IMAGE PICKUP DEVICE, AND ELECTRONIC CAMERA

(75) Inventor: Yoshiaki Komuro, Kanagawa (JP)

(73) Assignee: Sony Corporation, Tokyo (JP)

( * ) Notice: Subject to any disclaimer, the term of this patent is extended or adjusted under 35 U.S.C. 154(b) by 342 days.

(21) Appl. No.: 12/773,269

(22) Filed: May 4, 2010

(65) Prior Publication Data

US 2010/0302432 A1 Dec. 2, 2010

(30) Foreign Application Priority Data

May 26, 2009 (JP) ................................. 2009-126818

(51) Int. Cl.
*H04N 5/232* (2006.01)
(52) U.S. Cl.
USPC ............................. 348/345; 348/346; 348/347
(58) Field of Classification Search
USPC ................................................. 348/345–357
See application file for complete search history.

(56) References Cited

U.S. PATENT DOCUMENTS

| 2004/0257460 A1* | 12/2004 | Kuriyama | 348/340 |
| 2005/0236553 A1* | 10/2005 | Noto et al. | 250/208.1 |
| 2008/0291311 A1* | 11/2008 | Kusaka | 348/308 |

FOREIGN PATENT DOCUMENTS

| JP | 2001-083407 | 3/2001 |
| JP | 2003-244712 | 8/2003 |
| JP | 2009-109965 | 5/2009 |

OTHER PUBLICATIONS

Japanese Office Action for Japanese counterpart JP No. 2009-126818 dated Sep. 18, 2012.

* cited by examiner

*Primary Examiner* — Roberto Velez
*Assistant Examiner* — Yih-Sien Kao
(74) *Attorney, Agent, or Firm* — Dentons US LLP

(57) ABSTRACT

A focus detection apparatus includes first-type and second-type pixels and an image-formation-state detector. Each first-type pixel includes a photoelectric converter that receives light from an image-pickup optical system and first and second optical members arranged on an optical path from the optical system to the photoelectric converter and having different refractive indices, and outputs a first charge signal corresponding to an amount of light received by the photoelectric converter. Each second-type pixel includes the photoelectric converter and the first and second optical members arranged such that a positional relationship relative to the photoelectric converter differs from that in each first-type pixel, and outputs a second charge signal corresponding to an amount of light received by the photoelectric converter. The detector detects an image formation state of the image-pickup optical system on the basis of the first and second charge signals.

12 Claims, 21 Drawing Sheets

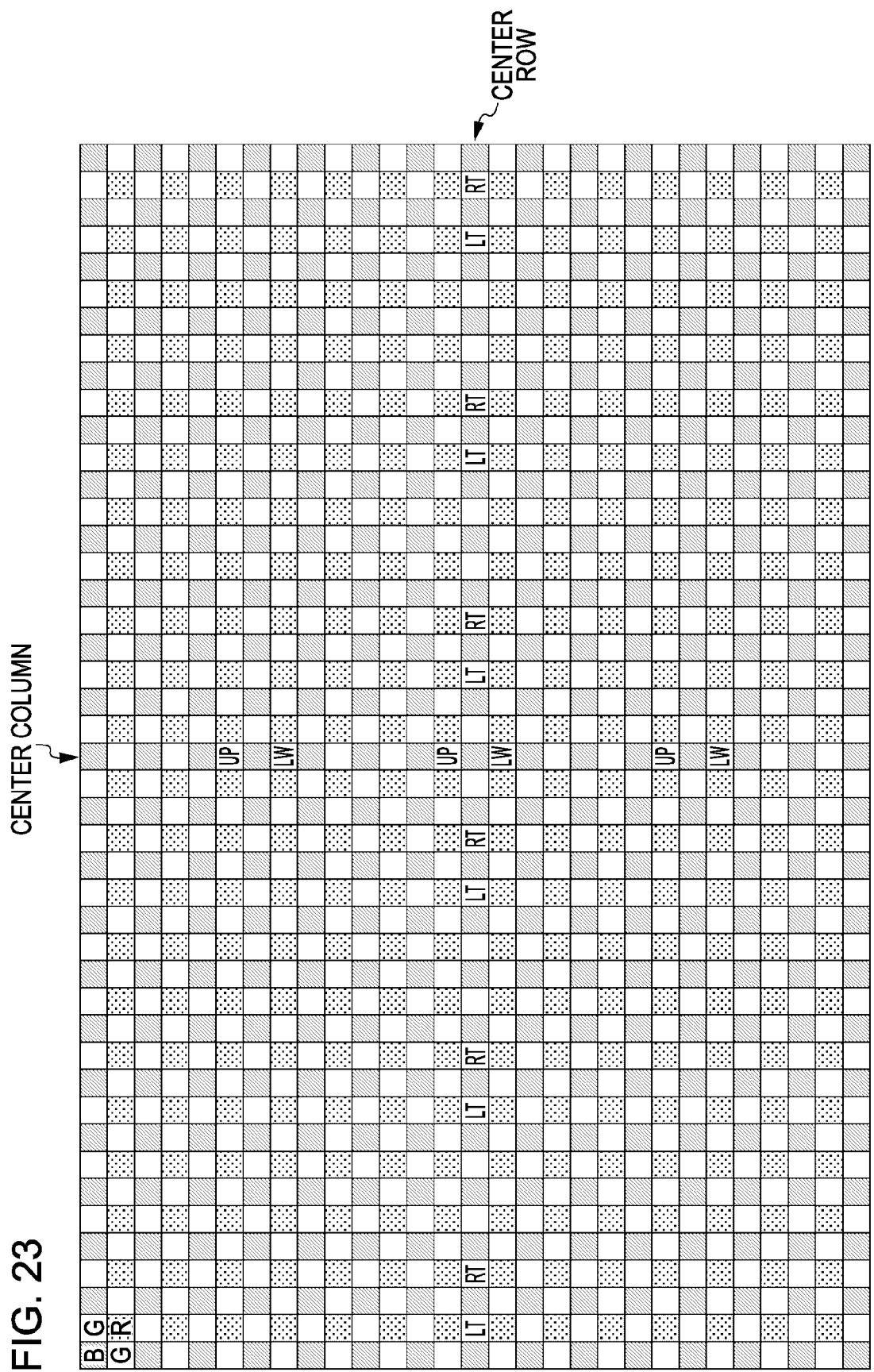

FOCUS DETECTION APPARATUS, IMAGE PICKUP DEVICE, AND ELECTRONIC CAMERA

BACKGROUND OF THE INVENTION

1. Field of the Invention

The present invention relates to a focus detection apparatus, an image pickup device, and an electronic camera, and more particularly to a focus control technique for a structure in which a focus detection system using a phase-difference detection method is installed in an image pickup device.

2. Description of the Related Art

A contrast detection method and a phase-difference detection method have been used as a focus detection technique for an electronic camera or the like. In the contrast detection method, an image signal output from an image pickup device is used to evaluate and determine the sharpness of an object image formed by an image-pickup optical system by using a predetermined function. The position of the image-pickup optical system on an optical axis is adjusted such that the function value approaches an extreme value. In the phase-difference detection method, two object images are formed by respective light beams that pass through different portions of an exit pupil of the image-pickup optical system. A positional phase difference between the two object images is detected, and is converted into an amount of defocus of the image-pickup optical system. According to the phase-difference detection method, since the amount of defocus can be determined, a focused state can be established in a shorter time compared to the contrast detection method in which the evaluation function value is determined while gradually moving the lenses of the image-pickup optical system along the optical axis.

According to the phase-difference detection method of the related art, a light beam that passes through the image-pickup optical system is divided into two beams by a condenser lens, and the thus-obtained two beams are caused to pass through respective separator lenses so that the beams are focused on a detection device (other than the image pickup device). This structure can be omitted by installing a focus detection system that uses the phase-difference detection method in the image pickup device itself (see, for example, Japanese Unexamined Patent Application Publications Nos. 2001-83407 (FIG. 18) and 2003-244712 (FIG. 2)).

For example, Japanese Unexamined Patent Application Publication No. 2001-83407 (FIG. 18) proposes a technique in which a photoelectric converter (photodiode) of each pixel is divided into two photoelectric converter parts which receive light beams that pass through an exit pupil of an image-pickup optical system at different areas of the exit pupil. Charge signals obtained by the two photoelectric converter parts of each pixel are compared with charge signals in a focused state that are obtained in advance. Thus, the focus detection using the phase-difference detection method is performed.

Japanese Unexamined Patent Application Publication No. 2003-244712 (FIG. 2) proposes a technique in which a photoelectric converter is not divided in pixels that are provided with a color filter and used to capture an image, but is divided into two photoelectric converter parts in pixels that are provided with no color filter and used for the focus detection. In the process of reading image signals in an image capturing operation, only the charge signals from the pixels provided with the color filter are used. In the process of focus detection, only the charge signals from the pixels provided with no color filter are used. Thus, the focus detection using the phase-difference detection method is performed.

SUMMARY OF THE INVENTION

In the above-described structures according to the related art, two photoelectric converter parts are disposed in each pixel such that the photoelectric converter parts are separated from each other. Therefore, the area between the two photoelectric converter parts does not function as a light-receiving portion, and this reduces the light-receiving area of a unit pixel. Accordingly, the maximum storable charge and the dynamic range of the photoelectric converter parts are reduced. Although only some of the pixels are used for the focus detection, portions around the photoelectric converter parts in the pixels used for the focus detection have the most complex structure. Therefore, in the case of reducing the pixel size to increase the number of pixels, the minimum pixel size in the image pickup device is limited by the size of the pixels for the focus detection.

In light of the above-described situation, it is desirable to provide a technique for suppressing the reduction in the light-receiving area of a unit pixel in the structure in which a focus detection system using a phase-difference detection method is installed in an image pickup device.

According to a first embodiment of the present invention, a focus detection apparatus includes a plurality of first-type pixels, each first-type pixel including a photoelectric converter, a first optical member, and a second optical member, the photoelectric converter being configured to receive light from an image-pickup optical system and perform photoelectric conversion, the first and second optical members being arranged on an optical path from the image-pickup optical system to the photoelectric converter and having different refractive indices, each first-type pixel outputting a first charge signal corresponding to an amount of light received by the photoelectric converter; a plurality of second-type pixels, each second-type pixel including the photoelectric converter, the first optical member, and the second optical member, the first and second optical members being arranged on the optical path from the image-pickup optical system to the photoelectric converter such that a positional relationship between the first and second optical members and the photoelectric converter differs from the positional relationship in each first-type pixel, each second-type pixel outputting a second charge signal corresponding to an amount of light received by the photoelectric converter; and an image-formation-state detector configured to detect an image formation state of the image-pickup optical system on the basis of the first charge signals and the second charge signals. Accordingly, in the light that passes through the image-pickup optical system, components that contribute to the first charge signals and components that contribute to the second charge signals differ from each other.

In the first embodiment, each of the first-type pixels and the second-type pixels may further include a light-collecting unit on the optical path from the image-pickup optical system to the photoelectric converter, the light-collecting unit collecting incident light from the image-pickup optical system on the photoelectric converter. The first and second optical members are disposed between the light-collecting unit and the photoelectric converter. Accordingly, the light from the image-pickup optical system can be efficiently collected. In addition, the first and second optical members may be arranged such that a unit including the first and second optical members is opposed to an entire body of the photoelectric converter, such that the areas in which the first and second optical members are opposed to the photoelectric converter differ from each other, and such that the first and second optical members do not overlap with each other in an optical axis direction of the image-pickup optical system, and the first and second optical members may be arranged such that a position of a boundary between the first and second optical members in each first-type pixel and a position of a boundary between the first and second optical members in each second-type pixel are at opposite sides of an axis that passes through the center of the photoelectric converter in the optical axis direction. Accordingly, light components from different sections of the image-pickup optical system can be selectively collected by the first-type pixels and the second-type pixels.

In addition, in the first embodiment, each of the first-type pixels and the second-type pixels may further include a light-collecting unit on the optical path from the image-pickup optical system to the photoelectric converter, the light-collecting unit collecting incident light from the image-pickup optical system on the photoelectric converter, and the first and second optical members may be disposed between the image-pickup optical system and the light-collecting unit. Accordingly, the light from the image-pickup optical system can be efficiently collected on the photoelectric converter.

In addition, in the first embodiment, each of the first-type pixels and the second-type pixels may further include an optical filter on the optical path from the image-pickup optical system to the photoelectric converter, the optical filter selectively transmitting light with a predetermined wavelength range. Accordingly, the wavelength of light incident on the first-type pixels and the second-type pixels can be limited within a predetermined wavelength range.

In addition, in the first embodiment, each of the first-type pixels may further include a first optical filter or a second optical filter on the optical path from the image-pickup optical system to the photoelectric converter, the first optical filter selectively transmitting light with a predetermined wavelength range, the second optical filter selectively transmitting light with another predetermined wavelength range, and each of the second-type pixels may further include the first optical filter or the second optical filter on the optical path from the image-pickup optical system to the photoelectric converter. Accordingly, the wavelength of light incident on some of the first-type pixels and the wavelength of light incident on other first-type pixels can be limited within different wavelength ranges. In addition, the wavelength of light incident on some of the second-type pixels and the wavelength of light incident on other second-type pixels can be limited within different wavelength ranges.

In addition, in the first embodiment, each of the first-type pixels and the second-type pixels may further include a waveguide member at a position between a unit including the first optical member and the second optical member and the photoelectric converter, the waveguide member guiding incident light from the image-pickup optical system toward the photoelectric converter by reflection. Accordingly, the length of the optical path of the light incident on the photoelectric converter after passing through the first or second optical member can be increased.

In addition, in the first embodiment, at least one of the first and second optical members may be composed of single crystal silicon, amorphous silicon, polysilicon, germanium, silicon dioxide, silicon nitride, siloxane, tungsten, aluminum, or copper. Accordingly, the first optical member or the second optical member can be formed of a single material by performing a suitable manufacturing process.

In addition, in the first embodiment, at least one of the first and second optical members may be provided with a film made of an optical material on a surface facing the image-pickup optical system, the optical material having a reflectance that is lower than a reflectance of an inner section of the at least one of the first and second optical members. Accordingly, the light from the image-pickup optical system can be efficiently collected on the photoelectric converter.

According to a second embodiment of the present invention, a focus detection apparatus includes a plurality of first-type pixels, each first-type pixel including a photoelectric converter configured to receive light from an image-pickup optical system and perform photoelectric conversion, a light-collecting unit configured to collect incident light from the image-pickup optical system on the photoelectric converter, and an optical layer disposed on an optical path from the image-pickup optical system to the photoelectric converter, each first-type pixel outputting a first charge signal corresponding to an amount of light received by the photoelectric converter; a plurality of second-type pixels, each second-type pixel including the photoelectric converter, the light-collecting unit, and the optical layer disposed on the optical path from the image-pickup optical system to the photoelectric converter, each second-type pixel outputting a second charge signal corresponding to an amount of light received by the photoelectric converter; and an image-formation-state detector configured to detect an image formation state of the image-pickup optical system on the basis of the first charge signals and the second charge signals. Each of the first-type pixels and the second-type pixels further includes an optical member having an refractive index that is different from a refractive index of the optical layer. The optical member included in each of the first-type pixels and the second-type pixels is disposed such that a peripheral edge of the optical member is separated from a straight line that passes through the center of the photoelectric converter along the optical axis direction of the image-pickup optical system and such that the optical member is opposed to only a part of the photoelectric converter. The optical member is disposed such that a position of one end of the optical member that is close to the straight line in each of the first-type pixels and a position of one end of the optical member that is close to the straight line in each of the second-type pixels are at the opposite sides of the straight line. Accordingly, light components from different sections of the image-pickup optical system can be selectively collected by the first-type pixels and the second-type pixels.

In the second embodiment, the optical member may be provided with a film made of an optical material on a surface facing the image-pickup optical system, the optical material having a reflectance that is lower than a reflectance of an inner section of the optical member. Accordingly, the light from the image-pickup optical system can be efficiently collected on the photoelectric converter.

According to a third embodiment of the present invention, a focus detection apparatus includes a plurality of first-type pixels, each first-type pixel including a photoelectric converter configured to receive light from an image-pickup optical system and perform photoelectric conversion and an optical member disposed on an optical path from the image-pickup optical system to the photoelectric converter such that the optical member is opposed to only a part of the photoelectric converter, the optical member having a laminated structure in which films made of optical materials having different refractive indices are stacked together, each first-type pixel outputting a first charge signal corresponding to an amount of light received by the photoelectric converter; a plurality of second-type pixels, each second-type pixel including the photoelectric converter and the optical member disposed on the optical path from the image-pickup optical system to the photoelectric converter such that a positional relationship between the optical member and the photoelectric converter differs from the positional relationship in each first-type pixel, each second-type pixel outputting a second charge signal corresponding to an amount of light received by the photoelectric converter; and an image-formation-state detector configured to detect an image formation state of the image-pickup optical system on the basis of the first charge signals and the second charge signals. Accordingly, if the optical member has a suitable shape and is suitably disposed, in the light that passes through the image-pickup optical system, components that contribute to the first charge signals and components that contribute to the second charge signals differ from each other.

In the third embodiment, the optical member may have a laminated structure in which the films made of the optical materials having different refractive indices are alternately stacked such that a normal line of lamination surfaces of the films is perpendicular to the optical axis direction of the image-pickup optical system. Accordingly, light that is obliquely incident on the lamination surfaces in the optical member causes a phase difference after passing through the optical member.

According to a fourth embodiment of the present invention, a focus detection apparatus includes a plurality of first-type pixels, each first-type pixel including a photoelectric converter configured to receive light from an image-pickup optical system and perform photoelectric conversion, an optical layer disposed on an optical path from the image-pickup optical system to the photoelectric converter, a first waveguide disposed in the optical layer and having a refractive index that is higher than a refractive index of the optical layer, and a second waveguide disposed adjacent to the first waveguide in the optical layer and having a refractive index that is higher than the refractive index of the first waveguide, each first-type pixel outputting a first charge signal corresponding to an amount of light received by the photoelectric converter; a plurality of second-type pixels, each second-type pixel including the photoelectric converter, the optical layer disposed on the optical path from the image-pickup optical system to the photoelectric converter, and the first and second waveguides disposed adjacent to each other in the optical layer such that a positional relationship between the first and second waveguides and the photoelectric converter differs from the positional relationship in each first-type pixel, each second-type pixel outputting a second charge signal corresponding to an amount of light received by the photoelectric converter; and an image-formation-state detector configured to detect an image formation state of the image-pickup optical system on the basis of the first charge signals and the second charge signals. Accordingly, in the light that passes through the image-pickup optical system, components that contribute to the first charge signals and components that contribute to the second charge signals differ from each other.

In the fourth embodiment, each of the first-type pixels and the second-type pixels may further include a light-collecting unit on the optical path, the light-collecting unit collecting incident light from the image-pickup optical system on the photoelectric converter, and the first and second waveguides may be arranged such that the positional relationship between the first and second waveguides in the first-type pixel and the positional relationship between the first and second waveguides in the second-type pixel are symmetrical to each other about an axis that passes through the center of the photoelectric converter in an optical axis direction of the image-pickup optical system. Accordingly, light components from different sections of the image-pickup optical system can be selectively collected by the first-type pixels and the second-type pixels.

According to a fifth embodiment of the present invention, an image pickup device includes a plurality of first-type pixels, each first-type pixel including a photoelectric converter, a first optical member, and a second optical member, the photoelectric converter being configured to receive light from an image-pickup optical system and perform photoelectric conversion, the first and second optical members being arranged on an optical path from the image-pickup optical system to the photoelectric converter and having different refractive indices, each first-type pixel outputting a first charge signal corresponding to an amount of light received by the photoelectric converter; a plurality of second-type pixels, each second-type pixel including the photoelectric converter, the first optical member, and the second optical member, the first and second optical members being arranged on the optical path from the image-pickup optical system to the photoelectric converter such that a positional relationship between the first and second optical members and the photoelectric converter differs from the positional relationship in each first-type pixel, each second-type pixel outputting a second charge signal corresponding to an amount of light received by the photoelectric converter; and a plurality of image pickup pixels, each image pickup pixel including the photoelectric converter and outputting a third charge signal corresponding to an amount of light received by the photoelectric converter. Accordingly, if the first and second optical members are suitably arranged, in the light that passes through the image-pickup optical system, components that contribute to the first charge signals and components that contribute to the second charge signals differ from each other.

According to a sixth embodiment of the present invention, an electronic camera includes a plurality of first-type pixels, each first-type pixel including a photoelectric converter, a first optical member, and a second optical member, the photoelectric converter being configured to receive light from an image-pickup optical system and perform photoelectric conversion, the first and second optical members being arranged on an optical path from the image-pickup optical system to the photoelectric converter and having different refractive indices, each first-type pixel outputting a first charge signal corresponding to an amount of light received by the photoelectric converter; a plurality of second-type pixels, each second-type pixel including the photoelectric converter, the first optical member, and the second optical member, the first and second optical members being arranged on the optical path from the image-pickup optical system to the photoelectric converter such that a positional relationship between the first and second optical members and the photoelectric converter differs from the positional relationship in each first-type pixel, each second-type pixel outputting a second charge signal corresponding to an amount of light received by the photoelectric converter; a plurality of image pickup pixels, each image pickup pixel including the photoelectric converter and outputting a third charge signal corresponding to an amount of light received by the photoelectric converter; a signal processor configured to generate image data on the basis of the third charge signals; an image-formation-state detector configured to detect an image formation state of the image-pickup optical system on the basis of the first charge signals and the second charge signals; and a focus controller configured to adjust a lens position of the image-pickup optical system such that the lens position approaches an in-focus position on the basis of the image formation state determined by the image-formation-state detector. Accordingly, in the light that passes through the image-pickup optical system, components that contribute to the first charge signals and components that contribute to the second charge signals differ from each other.

According to the embodiments of the present invention, in the structure in which a focus detection system using a phase-difference detection method is installed in an image pickup device, it is not necessary to divide the photoelectric converter in the pixels used for the focus detection. Therefore, reduction in the light-receiving area of a unit pixel can be prevented.

BRIEF DESCRIPTION OF THE DRAWINGS

FIG. 23 is a schematic plan view illustrating a modification of the arrangement of the focus detection pixels in the overall area of the image pickup device according to the embodiments of the present invention.

DESCRIPTION OF THE PREFERRED EMBODIMENTS

Embodiments of the present invention will now be described in the following order:

1. First Embodiment (example of a camera system including a focus detection apparatus provided with two filters having different refractive indices)
2. Second Embodiment (example in which no color filter is provided)
3. Third Embodiment (example in which no low-refractive-index filter is provided)
4. Fourth Embodiment (example in which a laminated filter is provided)
5. Fifth Embodiment (example in which filters are disposed closer to an image-pickup optical system than a microlens)
6. Sixth Embodiment (example in which a waveguide member are additionally provided)
7. Seventh Embodiment (example in which an intermediate-refractive-index waveguide and a high-refractive-index waveguide are provided)
8. Modifications of arrangement of refractive filters in focus detection pixels according to embodiments of the present invention
9. Modification of arrangement of color filters according to embodiments of the present invention
10. Modification of arrangement of focus detection pixels in an image pickup device according to embodiments of the present invention

1. First Embodiment

Overall Structure of Camera System

Figure 1:
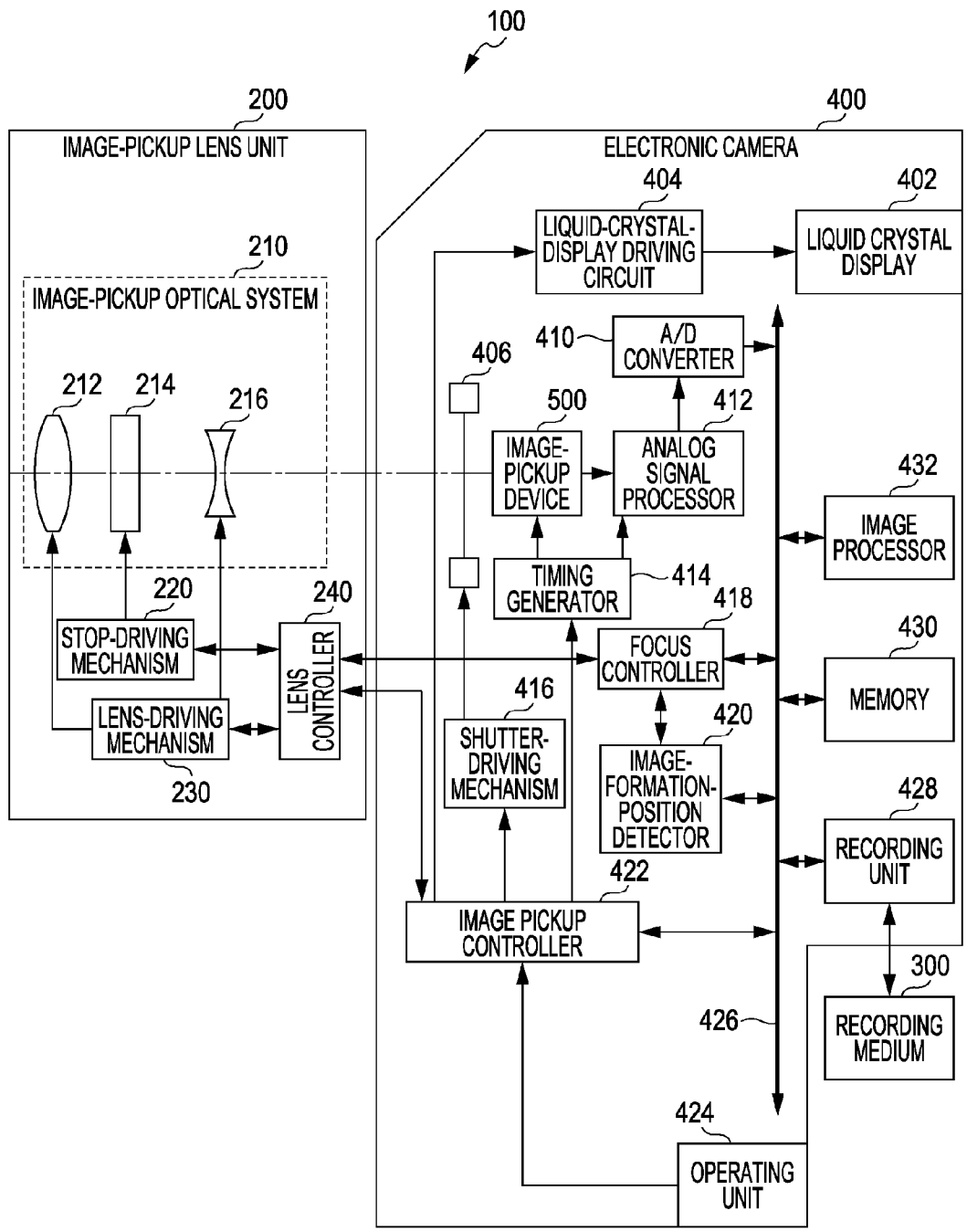
FIG. 1 is a block diagram of a camera system according to a first embodiment of the present invention.

FIG. 1 is a block diagram of a camera system 100 according to a first embodiment of the present invention. The camera system 100 includes a replaceable image pickup lens unit 200 and a replaceable recording medium 300 that are attached to or inserted in an electronic camera 400.

The image pickup lens unit 200 adjusts the amount of light from an object and forms an optical image of the object on a pixel array plane in an image pickup device 500 included in the electronic camera 400. The image pickup lens unit 200 includes an image-pickup optical system 210, a stop-driving mechanism 220, a lens-driving mechanism 230, and a lens controller 240.

The image-pickup optical system 210 forms the optical image of the object. The image-pickup optical system 210 includes a convex lens 212 that collects light from the object, a stop 214 that adjusts the amount of light that passes therethrough, and a concave lens 216. Although only two lenses (212 and 216) are shown in FIG. 1 for simplicity, more lenses are generally included in the image-pickup optical system 210 in practice.

The lens controller 240 has the following two functions. The first function is to adjust the stop 214 so as to satisfy suitable exposure conditions by controlling the stop-driving mechanism 220 in accordance with a command from an image pickup controller 422, which will be described below. The second function is to adjust the positions of the convex lens 212 and the concave lens 216 on an optical axis of the image-pickup optical system 210 so as to establish a focused state by controlling the lens-driving mechanism 230 in accordance with a command from a focus controller 418, which will be described below.

In the electronic camera 400, the image pickup lens unit 200 forms the optical image of the object on the pixel array plane in the image pickup device 500. The electronic camera 400 generates image data of the object image, and records the generated image data on the recording medium 300. The electronic camera 400 includes a shutter 406, the image pickup device 500, an A/D converter 410, an analog signal processor 412, a timing generator 414, a shutter-driving mechanism 416, the focus controller 418, an image-formation-position detector 420, and the image pickup controller 422. The electronic camera 400 also includes a liquid crystal display 402, a liquid-crystal-display driving circuit 404, an operating unit 424, a system bus 426, a recording unit 428, a memory 430, and an image processor 432.

The image pickup controller 422 performs system control of the electronic camera 400 through the system bus 426.

The shutter 406 controls the exposure time for the pixel array plane in the image pickup device 500, and includes a front curtain and a rear curtain.

The shutter-driving mechanism 416 controls movements of the front and rear curtains of the shutter 406 in accordance with a command from the image pickup controller 422.

The timing generator 414 drives the image pickup device 500 in accordance with a command from the image pickup controller 422.

The image pickup device 500 receives light from the image-pickup optical system 210 and performs photoelectric conversion of the received light. The image pickup device 500 includes a plurality of focus detection pixels and many image pickup pixels. The focus detection pixels output charge signals used for focus detection based on the phase-difference detection method. The "image pickup pixels" referred to in this specification are so-called effective pixels which are pixels other than the optical black pixels and which output charge signals on the basis of which the image data is generated. The focus detection pixels and the image pickup pixels both accumulate electric charges in accordance with the amount of light received thereby, and output (analog) charge signals.

The analog signal processor 412 subjects the charge signals from the respective pixels output by the image pickup device 500 to a clamping process, a sensitivity correction process, and the like.

The A/D converter 410 converts the (analog) charge signals from the pixels into digital signals after the charge signals are subjected to the processes performed by the analog signal processor 412.

The image processor 432 extracts digital signals corresponding to the image pickup pixels from the digital signals corresponding to all of the pixels output from the A/D converter 410, and subjects the extracted digital signals to a color interpolation process and other processes, thereby producing image data.

The recording unit 428 records the image data generated by the image processor 432 on the recording medium 300.

The liquid-crystal-display driving circuit 404 causes the liquid crystal display 402 to display an image corresponding to the image data generated by the image processor 432 in response to a command from the image pickup controller 422.

The liquid crystal display 402 displays a moving image of the object while a user is waiting for the right moment to shoot, and displays a still image after the image of the object is captured.

The system bus 426 transmits the digital signals output from the A/D converter 410, the image data, and control signals output by the image pickup controller 422.

The image-formation-position detector 420 detects the position of the focal plane on the optical axis of the image-pickup optical system 210 on the basis of the digital signals corresponding to the charge signals from the focus detection pixels.

The focus controller 418 moves the focal plane to the pixel array plane of the image pickup device 500 by controlling the lens-driving mechanism 230 through the lens controller 240 on the basis of the position of the focal plane detected by the image-formation-position detector 420.

The memory 430 temporarily stores the image data before the image data is subjected to data conversion into a predetermined format or processing.

The operating unit 424 is provided to receive an operation input from the user, and includes an exposure-condition setting button, a release button, etc. (not shown).

According to the present embodiment, a focus detection system using the phase-difference detection method is installed in the focus detection pixels included in the image pickup device 500. Other structures of the present embodiment are similar to those of a camera system according to the related art, and explanations thereof are thus omitted.

The image-formation-position detector 420 is an example of an image-formation-state detector described in the claims. The image pickup device 500 is an example of a focus detection apparatus described in the claims. The analog signal processor 412, the A/D converter 410, and the image processor 432 are examples an image processor described in the claims.

Pixel Arrangement in Image Pickup Device

Figure 2:
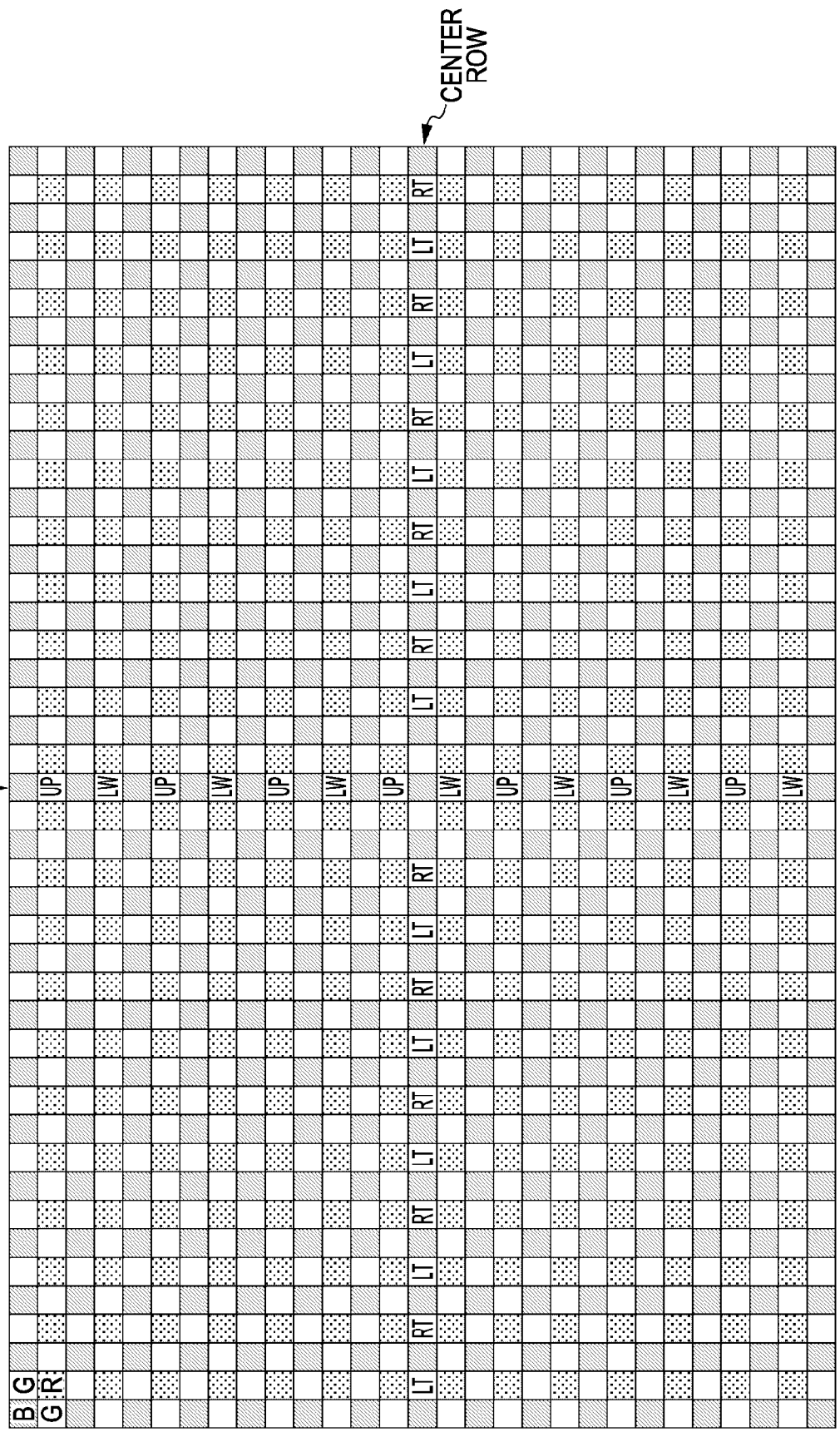
FIG. 2 is a schematic plan view illustrating a pixel arrangement in an image pickup device according to the first embodiment of the present invention.

FIG. 2 is a schematic plan view illustrating the pixel arrangement in the image pickup device 500. As shown by R, G, and B in the upper left section of FIG. 2, in the image pickup device 500, pixels corresponding to the three primary colors, that is, red (R), green (G), and blue (B), are arranged in a Bayer pattern except for the focus detection pixels. In FIG. 2, pixels shown by hatched sections are the pixels that selectively receive blue light. In addition, pixels shown by gray sections represented by small dots are the pixels that selectively receive red light. In addition, pixels shown by blank sections are the pixels that selectively receive green light.

In FIG. 2, the pixels labeled "UP" and "LW" in the center pixel column and the pixels labeled "RT" and "LT" in the center pixel row are the focus detection pixels. The pixels labeled "UP" selectively collect light that passes through an upper section of the image-pickup optical system 210. Similarly, the pixels labeled "LW" selectively collect light that passes through a lower section of the image-pickup optical system 210, and the pixels labeled "LT" and "RT" selectively collect light that passes through a left section and a right section, respectively, of the image-pickup optical system 210. Although only 29 rows and 45 columns of pixels are shown in FIG. 2 for simplicity, about ten million pixels are arranged in practice.

Figure 3:
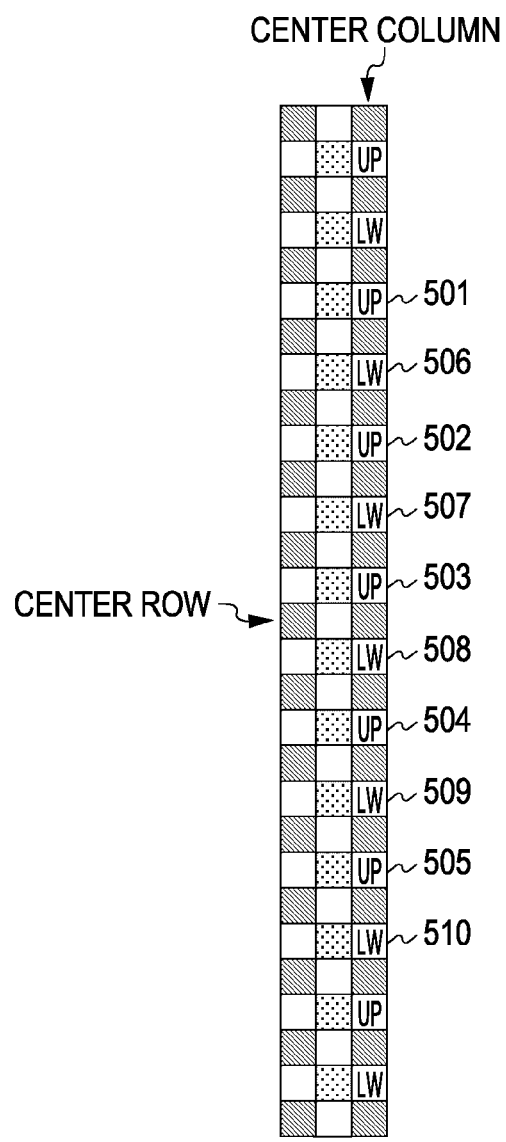
FIG. 3 is an enlarged partial view of FIG. 2 illustrating an area around a center pixel column in which focus detection pixels are arranged.

FIG. 3 is an enlarged partial view of FIG. 2 illustrating the center pixel column in which the focus detection pixels are arranged and two pixel columns on the left side of the center pixel column. Referring to FIG. 3, five focus detection pixels that collect light from the upper section of the image-pickup optical system 210 will be referred to as upper-section detection pixels 501, 502, 503, 504, and 505 in the explanations given below. Similarly, five focus detection pixels that collect light from the lower section of the image-pickup optical system 210 will be referred to as lower-section detection pixels 506, 507, 508, 509, and 510.

Structure of Image Pickup Pixel in Image Pickup Device

Figure 4A:
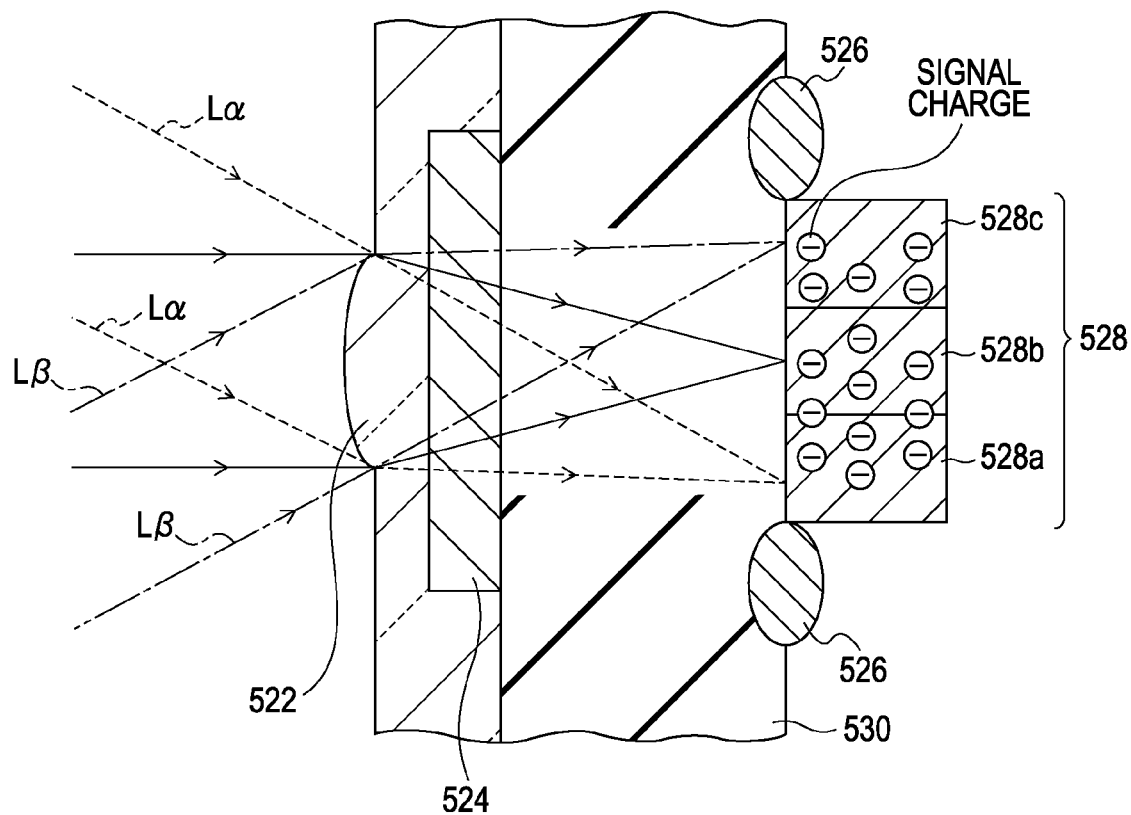
FIGS. 4A and 4B are diagrams illustrating an image pickup pixel in the image pickup device according to the first embodiment of the present invention.
Figure 4B:
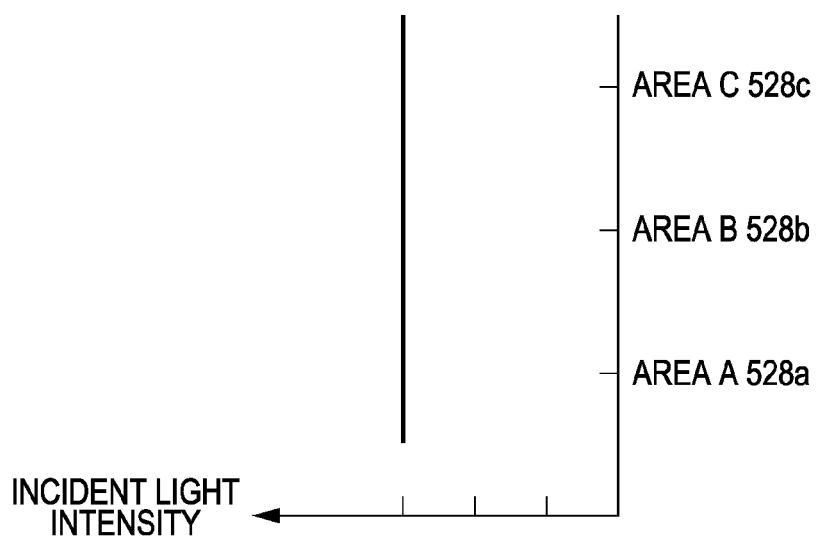

FIG. 4A is a schematic sectional view of an image pickup pixel corresponding to a green light component and FIG. 4B is a graph showing the intensity of light incident on a photodiode 528 in the image pickup pixel at different areas of the photodiode 528. As shown in FIG. 4A, the image pickup pixel is structured such that a microlens 522, a color filter 524, element separation areas 526, the photodiode 528, and a silicon oxide film 530 are formed on a silicon substrate (not shown).

The microlens 522 collects light from the image-pickup optical system 210 on the photodiode 528.

The color filter 524 selectively transmits green light.

The element separation areas 526 electrically separate the photodiode 528 from the surrounding area.

The silicon oxide film 530 causes light that passes through the microlens 522 and the color filter 524 to pass therethrough toward the photodiode 528. The silicon oxide film 530 covers the entire area between the photodiode 528 and the color filter 524 and continuously extends over the pixels. The element separation areas 526 are formed by, for example, shallow trench isolation (STI) or local oxidation of silicon (LOCOS).

The photodiode 528 shown in FIG. 4A is evenly divided into three areas, which are an area A 528a at the bottom, an area B 528b at the center, and an area C 528c at the top, in the column direction (vertical direction) of the pixel array shown in FIG. 2. These areas are defined for explanation of the incident light intensity, and are not physically divided from each other but are formed integrally with each other in practice. This also applies to FIGS. 5A, 7A, 9, and 20, which will be described below. In FIG. 4A, the circled "−" signs show free electrons that serve as signal charges. However, electron holes may instead be provided as the signal charges by inverting the conductivity types (N-type and P-type) of the photodiode 528 and the surrounding area.

In FIG. 4A, the broken lines show an optical path of light Lα that passes through an upper section of the image-pickup optical system 210 and is incident on the microlens 522 (this light is hereinafter sometimes referred to simply as light Lα). In addition, the dotted chain lines show an optical path of light Lβ that passes through a lower section of the image-pickup optical system 210 and is incident on the microlens 522 (this light is hereinafter sometimes referred to simply as light Lβ). In addition, the solid lines with arrows show an optical path of light that is incident on the microlens 522 in a direction parallel to the optical axis thereof. The above-described relationship between the lines and the optical paths applies also to other figures. The optical axis direction of the microlens 522 is the same as the optical axis direction of the image-pickup optical system 210.

The light that passes through the image-pickup optical system 210 is refracted by the microlens 522 disposed in each pixel and passes through the color filter 524. Thus, the wavelength of the transmitted light is limited within a wavelength range around the wavelength of green light. Then, the light that passes through the color filter 524 passes through the silicon oxide film 530 and is incident on the photodiode 528, which performs photoelectric conversion.

At this time, the light Lα from the upper section of the image-pickup optical system 210 is collected by the microlens 522 in the area A 528a at the lower section of the photodiode 528. Similarly, the light Lβ from the lower section of the image-pickup optical system 210 is collected by the microlens 522 in the area C 528c at the upper section of the photodiode 528. In addition, the light that is incident on the microlens 522 in a direction parallel to the optical axis thereof is collected in the area B 528b. Therefore, as shown in FIG. 4B, the intensity of light that is incident on the photodiode 528 is substantially uniform over the three areas in the image pickup pixel.

The light Lα, the light Lβ, and the light incident on the microlens 522 in the direction parallel to the optical axis thereof may differ from each other. However, it can be assumed that the phase of light is substantially uniform if the light is emitted in a certain direction, passes through the image-pickup optical system 210, and is incident on a small area with a diameter of, for example, several micrometers, which corresponds to the diameter of the microlens 522. Therefore, the intensity of light that is emitted in a certain direction and passes through the microlens 522 is hardly reduced by interference in the optical path to the photodiode 528.

Structure of Focus Detection Pixel in Image Pickup Device

Figure 5A:
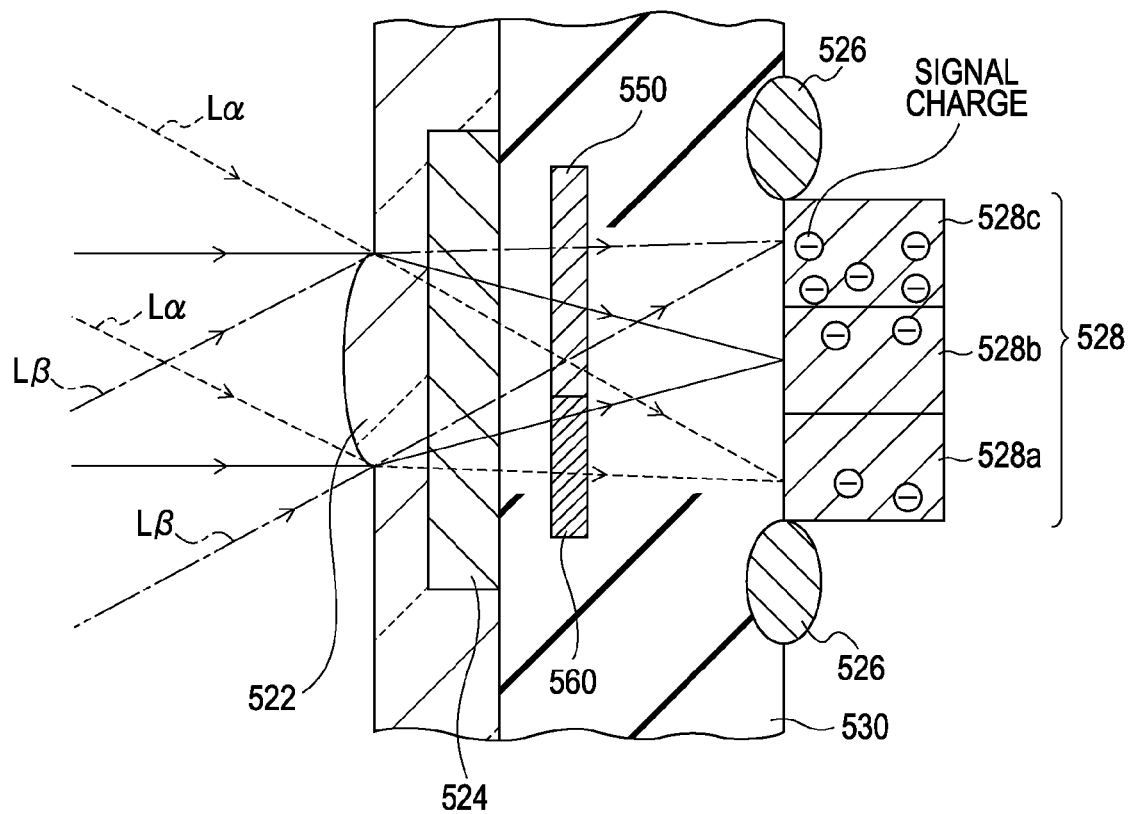
FIGS. 5A and 5B are diagrams illustrating a focus detection pixel that collects light from a lower section of an image-pickup optical system in the image pickup device according to the first embodiment of the present invention.
Figure 5B:
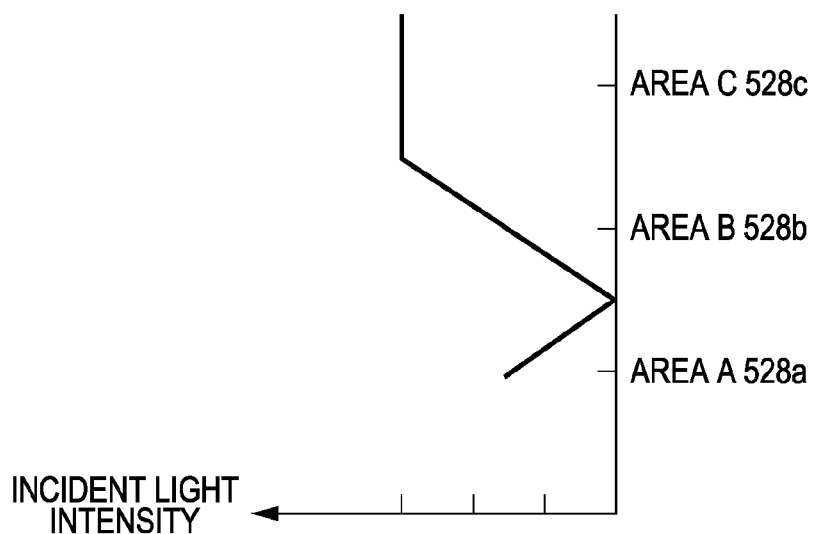

FIG. 5A is a schematic sectional view of a focus detection pixel that collects the light Lβ that passes through the lower section of the image-pickup optical system 210. FIG. 5B is a graph illustrating the intensity of light incident on the photodiode 528 in the focus detection pixel at different areas of the photodiode 528.

The image pickup pixel and the focus detection pixel have the following difference. That is, the focus detection pixel includes a low-refractive-index filter 550 and a high-refractive-index filter 560 in the silicon oxide film 530. The overall unit including the low-refractive-index filter 550 and the high-refractive-index filter 560 is positioned and shaped so as to be opposed to the entire body of the photodiode 528. In this specification, the term "opposed" means the state in which two elements are separated from each other but overlap with each other when viewed in the optical axis direction of the microlens 522 (the same direction as the thickness direction of the silicon substrate (not shown) on which the pixels are formed and the optical axis direction of the image-pickup optical system 210). The microlens 522 is disposed such that the optical axis thereof passes through the center of the photodiode 528 (center of the area B 528b).

The photodiode 528 is an example of a photoelectric converter described in the claims. In addition, one of the low-refractive-index filter 550 and the high-refractive-index filter 560 is an example of a first optical member described in the claims, and the other one is an example of a second optical member described in the claims. The microlens 522 is an example of a light collecting unit described in the claims. The color filter 524 is an example of an optical filter described in the claims. The optical axis of the microlens 522 is an example of "axis that passes through the center of the photoelectric converter in the optical axis direction" described in the claims.

The low-refractive-index filter 550 and the high-refractive-index filter 560 have the same thickness, and are arranged such that the thickness direction thereof is the same as the optical axis direction of the microlens 522. In the focus detection pixel shown in FIG. 5A, the area in which the low-refractive-index filter 550 is opposed to the photodiode 528 is larger than the area in which the high-refractive-index filter 560 is opposed to the photodiode 528.

More specifically, the boundary between the low-refractive-index filter 550 and the high-refractive-index filter 560 is disposed at a position that satisfies the following condition. That is, the condition that all of the light $L\beta$ passes through the low-refractive-index filter 550 without passing through the high-refractive-index filter 560 and the light $L\alpha$ passes through both the low-refractive-index filter 550 and the high-refractive-index filter 560. Therefore, the boundary between the low-refractive-index filter 550 and the high-refractive-index filter 560 is positioned below the optical axis of the microlens 522 (closer to the area A 528a of the photodiode 528). Optical materials used to form the low-refractive-index filter 550 and the high-refractive-index filter 560 will be described below.

Figure 6:
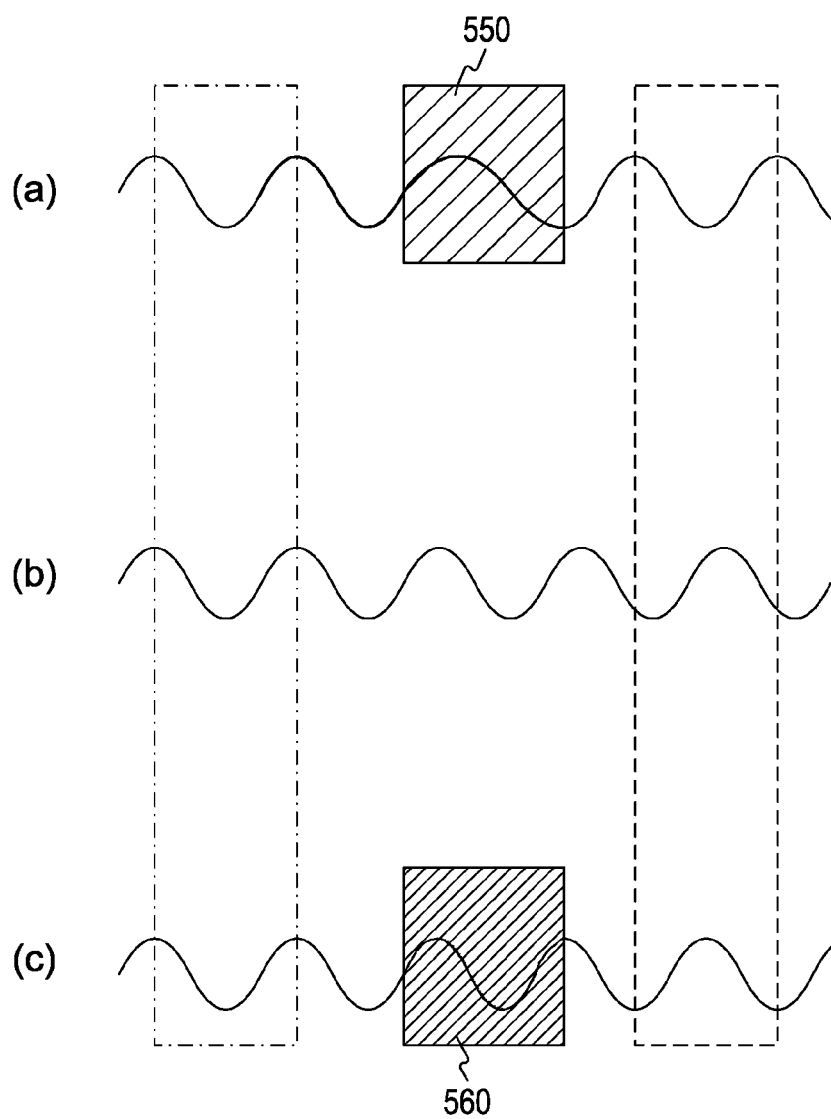
FIG. 6 is a diagram illustrating a phase difference between light that passes through a low-refractive-index filter and light that passes through a high-refractive-index filter.

FIG. 6 is a diagram illustrating a phase difference between light that has passed through the low-refractive-index filter 550 and light that has passed through the high-refractive-index filter 560. The three light waves shown in parts (a), (b), and (c) of FIG. 6 originally have the same phase, as is clear from the section surrounded by the dotted chain lines at the left side of FIG. 6. Part (b) of FIG. 6 shows the case in which light constantly travels through a single medium for comparison.

As shown in part (a) of FIG. 6, when light travels from a certain medium into a medium with a relatively low refractive index (low-refractive-index filter 550), the wavelength of light relatively increases in the medium with a relatively low refractive index. Conversely, as shown in part (c) of FIG. 6, when light travels from the certain medium into a medium with a relatively high refractive index (high-refractive-index filter 560), the wavelength of light relatively decreases in the medium with a relatively high refractive index.

According to the present embodiment, when n1 is a refractive index of the low-refractive-index filter 550, n2 is a refractive index of the high-refractive-index filter 560, d is a thickness (nm) of the low-refractive-index filter 550 and the high-refractive-index filter 560, and $\lambda$ is a wavelength (nm) of light, the refractive indices n1 and n2 and the thickness d are selected by using the above-described characteristics so as to satisfy the following equation:

$$(n2-n1) \times d = \lambda \div 2 \quad (1)$$

Accordingly, in the case where light that passes through the microlens 522 is incident on the low-refractive-index filter 550 and the high-refractive-index filter 560 at the same phase, the phase of light that passes through the low-refractive-index filter 550 and the phase of light that passes through the high-refractive-index filter 560 are shifted from each other by 180°, as is clear from the comparison between transmission waves shown in parts (a) and (c) in the section surrounded by the broken lines at the right side of FIG. 6. If light waves having the same wavelength, the same amplitude, and phases that are shifted from each other by 180° interfere with each other, the intensity of light is reduced to zero.

FIGS. 5A and 5B will be further described on the basis of the above-described principle. Although the light $L\alpha$ from the upper section of the image-pickup optical system 210 is shown by two broken lines in the figure, light in the area between the two broken lines is collected in practice. About half of the light $L\alpha$ passes through the low-refractive-index filter 550, and the remaining half passes through the high-refractive-index filter 560. Therefore, the phase of the part of light $L\alpha$ that passes through the low-refractive-index filter 550 and the phase of the part of light $L\alpha$ that passes through the high-refractive-index filter 560 are shifted from each other by 180°. As a result, the intensity of light is reduced by interference by the time the light $L\alpha$ is incident on the area A 528a of the photodiode 528.

If the percentage of the part of light $L\alpha$ that passes through the low-refractive-index filter 550 is equal to that of the part of light $L\alpha$ that passes through the high-refractive-index filter 560, the intensity of light that is incident on the area A 528a of the photodiode 528 is theoretically zero. However, in the focus detection pixel shown in FIG. 5A, the boundary between the low-refractive-index filter 550 and the high-refractive-index filter 560 is positioned such that more than half of the light $L\alpha$ passes through the high-refractive-index filter 560. Therefore, the intensity of light that is incident on the area A 528a is not reduced to zero.

The light $L\beta$ from the lower section of the image-pickup optical system 210 is refracted by the microlens 522 and passes through only the low-refractive-index filter 550 without passing through the high-refractive-index filter 560. Therefore, no interference between light waves with different phases occurs, and the intensity of light incident on the area C 528c of the photodiode 528 is not reduced. As a result, in the focus detection pixel shown in FIG. 5A, most of the light $L\alpha$ from the upper section of the image-pickup optical system 210 is not collected, whereas the light $L\beta$ from the lower section of the image-pickup optical system 210 is selectively collected. FIG. 5B shows the intensity of light incident on each area of the photodiode 528.

The interference of the light $L\alpha$ occurs not only in the silicon oxide film 530 but also in the photodiode 528 since silicon, which is the material of the photodiode 528, also transmits light. To absorb, for example, red light until the intensity thereof is reduced to half, it is necessary to cause the red light to reach a depth of 3 μm from the boundary between the silicon oxide film 530 and the photodiode 528. Therefore, if the light $L\alpha$ is red light, interference between the parts of light $L\alpha$ having a phase difference of 180° sufficiently occurs in the photodiode 528. In the case of blue light, which has a wavelength shorter than that of red light, the blue light is absorbed such that the intensity thereof is reduced to half by the time the blue light reaches a depth of 0.3 μm from the boundary between the silicon oxide film 530 and the photodiode 528. Therefore, the degree of interference of the blue light in the photodiode 528 is not as large as that of the red light in the photodiode 528.

Figure 7A:
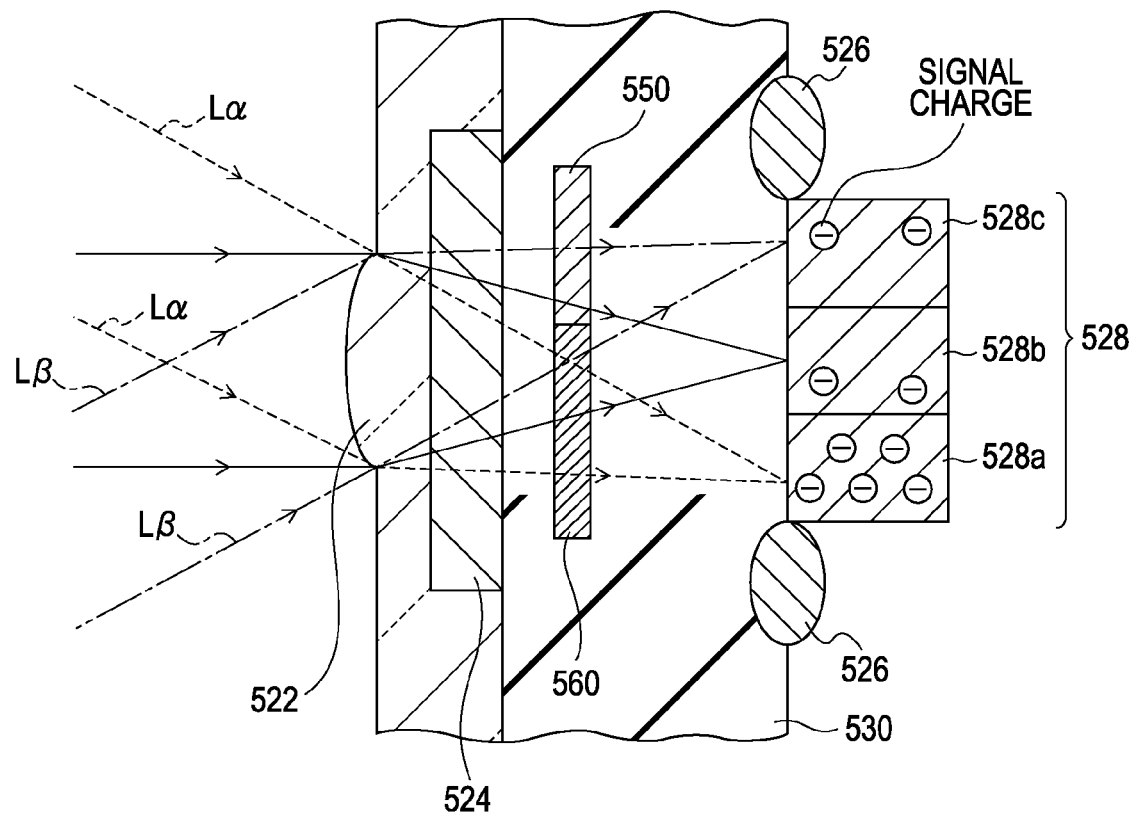
FIGS. 7A and 7B are diagrams illustrating a focus detection pixel that collects light from an upper section of the image-pickup optical system in the image pickup device according to the first embodiment of the present invention.
Figure 7B:
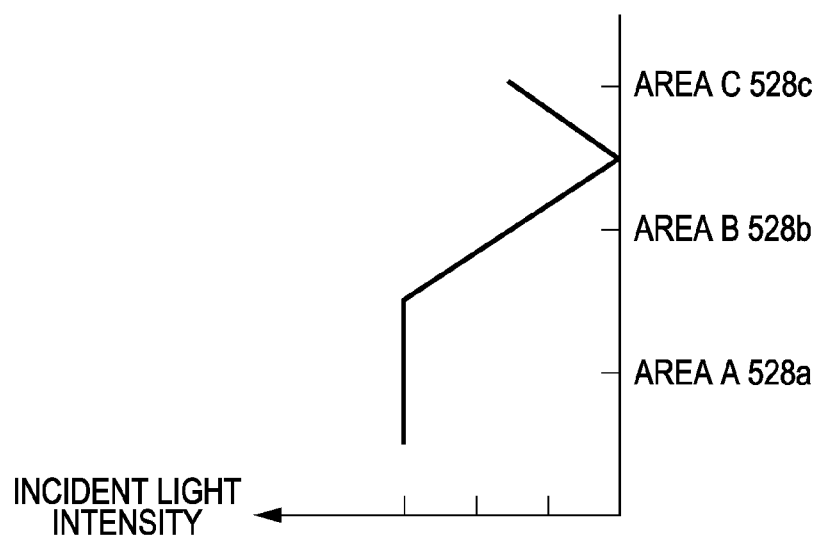

FIG. 7A is a schematic sectional view of a focus detection pixel that collects the light $L\alpha$ from the upper section of the image-pickup optical system 210. FIG. 7B is a graph illustrating the intensity of light incident on the photodiode 528 in the focus detection pixel at different areas of the photodiode 528. The difference between the focus detection pixel shown in FIG. 7A and the focus detection pixel shown in FIG. 5A which collects the light Lβ from the lower section of the image-pickup optical system 210 is only the sizes and the arrangement of the low-refractive-index filter 550 and the high-refractive-index filter 560. Similar to the focus detection pixel shown in FIG. 5A, the overall unit including the low-refractive-index filter 550 and the high-refractive-index filter 560 is positioned so as to be opposed to the entire body of the photodiode 528, and the low-refractive-index filter 550 and the high-refractive-index filter 560 are arranged such that the thickness direction thereof is the same as the optical axis direction of the microlens 522.

In the focus detection pixel shown in FIG. 7A, the area in which the high-refractive-index filter 560 is opposed to the photodiode 528 is larger than the area in which the low-refractive-index filter 550 is opposed to the photodiode 528. More specifically, the boundary between the low-refractive-index filter 550 and the high-refractive-index filter 560 is disposed at the position that satisfies the following condition.

That is, the condition that all of the light Lα passes through the high-refractive-index filter 560 without passing through the low-refractive-index filter 550 and the light Lβ passes through both the low-refractive-index filter 550 and the high-refractive-index filter 560. Accordingly, the boundary between the low-refractive-index filter 550 and the high-refractive-index filter 560 is positioned above the optical axis of the microlens 522 in FIG. 7A at a position symmetrical to that in the focus detection pixel shown in FIG. 5A.

The light Lα from the upper section of the image-pickup optical system 210 passes through only the high-refractive-index filter 560. Therefore, no interference between light waves with different phases occurs, and the intensity of light incident on the area A 528a of the photodiode 528 is not reduced. In contrast, about half of the light Lβ from the lower section of the image-pickup optical system 210 passes through the low-refractive-index filter 550, and the remaining half passes through the high-refractive-index filter 560. Therefore, the phase of the part of light Lβ that passes through the low-refractive-index filter 550 and the phase of the part of light Lβ that passes through the high-refractive-index filter 560 are shifted from each other by 180°. Accordingly, the intensity of light is reduced by interference by the time the light Lβ is incident on the area C 528c of the photodiode 528. As a result, in the focus detection pixel shown in FIG. 7A, the light Lα from the upper section of the image-pickup optical system 210 is selectively collected. FIG. 7B shows the intensity of light incident on each area of the photodiode 528.

One of the focus detection pixel that collects the light Lα shown in FIG. 7A and the focus detection pixel that collects the light Lβ shown in FIG. 7A is an example of a first-type pixel described in the claims, and the other one is an example of a second-type pixel described in the claims.

Principle of Focus Detection

Figure 8A:
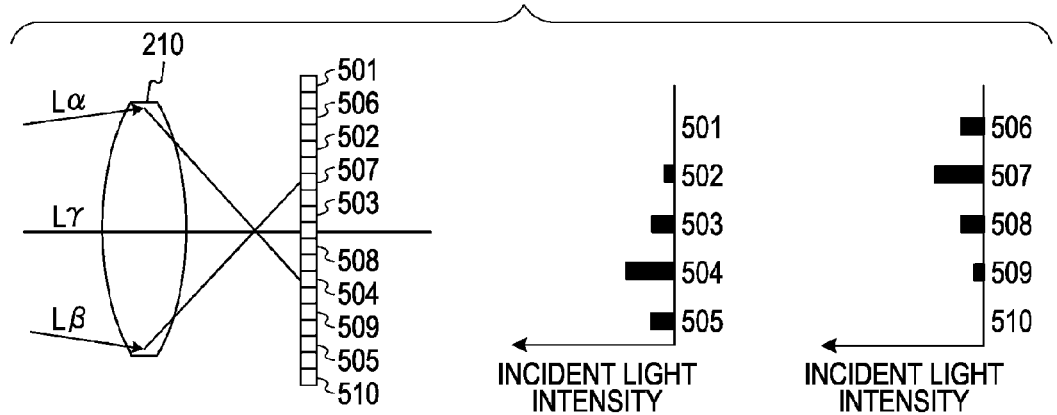
FIGS. 8A, 8B, and 8C are diagrams illustrating intensities of light incident on focus detection pixels in the cases of front focus, in-focus, and rear focus, respectively.
Figure 8B:
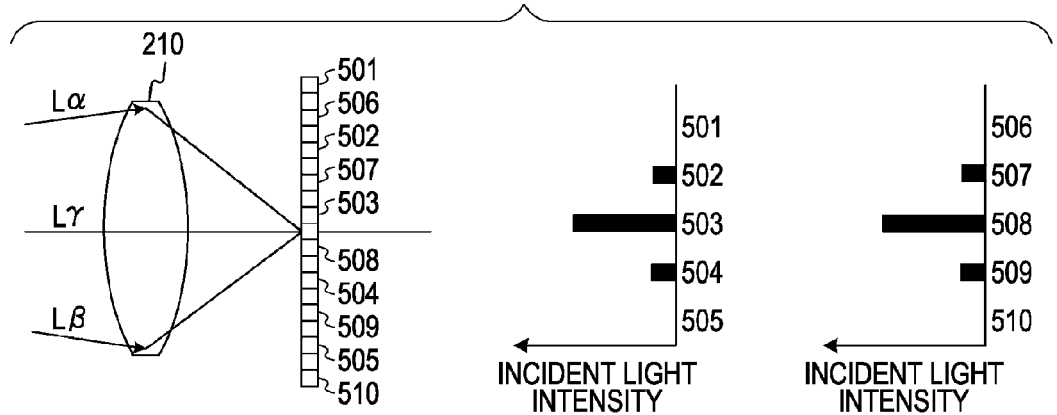
Figure 8C:
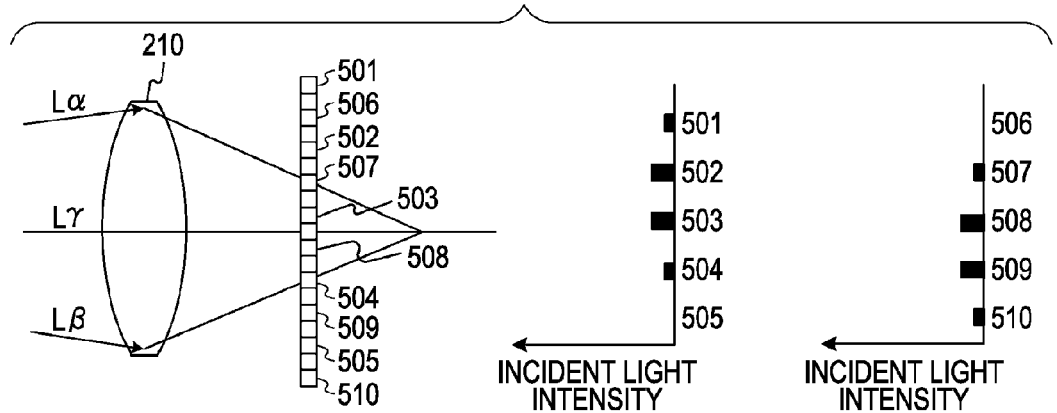

FIGS. 8A, 8B, and 8C are diagrams illustrating the intensities of light incident on the focus detection pixels. FIG. 8A shows the case in which the focal plane is positioned closer to the image-pickup optical system 210 than the pixel array plane of the image pickup device 500, that is, in the case of front focus. FIG. 8B shows the in-focus state, and FIG. 8C shows the case in which the focal plane is positioned closer to the inside of the image pickup device 500 than the pixel array plane, that is, in the case of rear focus. For simplicity, the image-pickup optical system 210 is shown as a single lens in FIGS. 8A to 8C.

Each of the upper-section detection pixels 501 to 505 shown in FIGS. 8A to 8C, which are also denoted by the respective reference numerals in FIG. 3, has the structure of the focus detection pixel shown in FIG. 7A that collects the light Lα from the upper section of the image-pickup optical system 210. Similarly, each of the lower-section detection pixels 506 to 510 shown in FIGS. 8A to 8C has the structure of the focus detection pixel shown in FIG. 5A that collects the light Lβ from the lower section of the image-pickup optical system 210. In each of FIGS. 8A, 8B, and 8C, the left graph shows the intensities of light incident on the lower-section detection pixels 506 to 510 and the right graph shows the intensities of light incident on the upper-section detection pixels 501 to 505.

In the following description, it is assumed that light emitted from a bright spot (not shown) on the optical axis of the image-pickup optical system 210 is incident on the image-pickup optical system 210. In FIGS. 8A to 8C, only light rays incident in three directions, that is, the light Lα from the upper section of the image-pickup optical system 210, the light Lβ from the lower section of the image-pickup optical system 210, and light Lγ that travels along the optical axis direction of the image-pickup optical system 210, are shown for simplicity. The light Lα, the light Lβ, and the light Lγ that travel in respective directions are refracted by the image-pickup optical system 210 and are incident on the image pickup device 500.

If the positions of the convex lens 212 and the concave lens 216 included in the image-pickup optical system 210 are adjusted such that the light is focused on the pixel array plane in the image pickup device 500, the intensities of light incident on the upper-section detection pixels 501 to 505 and the lower-section detection pixels 506 to 510 are obtained as shown in FIG. 8B.

The pixel between the upper-section detection pixel 503 and the lower-section detection pixel 508 is the pixel positioned at the center of the pixel array in the image pickup device 500, that is, the pixel on the optical axis of the image-pickup optical system 210. The light Lα, the light Lβ, and the light Lγ are refracted by the image-pickup optical system 210 and are collected at the pixel on the optical axis. Therefore, the incident light intensity is high in the upper-section detection pixel 503 and the lower-section detection pixel 508, and decreases as the distance from the pixel on the optical axis increases. This is because although the light Lα, the light Lβ, and the light Lγ are ideally collected at the optical axis, they slightly spread in practice owing to the aberrations of the image-pickup optical system 210.

The light Lγ that travels in the optical axis direction is mainly collected at the pixel on the optical axis irrespective of whether the system is in the front focus state or the rear focus state.

In the case of front focus, the light Lα from the upper section of the image-pickup optical system 210 is mainly collected at the upper-section detection pixel 504 which is positioned below the pixel on the optical axis. Therefore, the incident light intensity is high at the upper-section detection pixel 504. In addition, the light Lβ from the lower section of the image-pickup optical system 210 is mainly collected at the lower-section detection pixel 507 which is positioned above the pixel on the optical axis. Therefore, the incident light intensity high at the lower-section detection pixel 507. Thus, in the case of front focus, the intensities of light incident on the upper-section detection pixels 501 to 505 and the lower-section detection pixels 506 to 510 are obtained as shown in FIG. 8A.

In the case of rear focus, the light Lα from the upper section of the image-pickup optical system 210 is mainly collected at the lower-section detection pixel 507. However, the lower-section detection pixel 507 does not collect the light Lα. Therefore, the incident light intensity is increased at the upper-section detection pixels 502 and 503, which are close to the lower-section detection pixel 507. Similarly, although the light Lβ from the lower section of the image-pickup optical system 210 is mainly collected at the upper-section detection pixel 504, the upper-section detection pixel 504 does not collect the light Lβ. Therefore, the incident light intensity is increased at the lower-section detection pixels 508 and 509, which are close to the upper-section detection pixel 504. Accordingly, the intensities of light incident on the upper-section detection pixels 501 to 505 and the lower-section detection pixels 506 to 510 are obtained as shown in FIG. 8C. Therefore, whether the system is in the front focus or the rear focus and the degree of defocus can be determined by detecting the positions of the pixels corresponding to the maximum incident light intensities among the upper-section detection pixels 501 to 505 and the lower-section detection pixels 506 to 510.

Example of Focus Detection Operation

A focus detection operation will now be described with reference to the block diagram of the camera system 100 according to the present embodiment shown in FIG. 1. Before the image pickup operation, the image pickup controller 422 and the focus controller 418 communicate with the lens controller 240 via electric contact units (not shown) to obtain information specific to the image pickup lens unit 200 and information of the current lens position and stop position.

While a moving image is being displayed on the liquid crystal display 402 (for example, while the user is waiting for the right moment to shoot), the image pickup device 500 is exposed to light and the following processes are performed.

That is, the image pickup controller 422 controls the timing generator 414 and performs an electronic shutter operation in which charges accumulated in the photodiode 528 in each of the pixels (focus detection pixels and image pickup pixels) included in the image pickup device 500 are output as charge signals at a predetermined time interval. The charge signals read from the respective pixels are subjected to the clamping process, the sensitivity correction process, etc., by the analog signal processor 412, converged into digital signals by the A/D converter 410, and are output to the system bus 426.

The image-formation-position detector 420 extracts digital signals corresponding to the focus detection pixels from the digital signals corresponding to all of the pixels.

Next, the image-formation-position detector 420 detects the position of a pixel corresponding to the largest signal value in each of the group of focus detection pixels that collect the light Lα (pixels labeled "UP" in FIG. 2) and the group of focus detection pixels that collect the light Lβ (pixels labeled "LW" in FIG. 2). The image-formation-position detector 420 detects the position of the focal plane along the optical axis of the image-pickup optical system 210 on the basis of the difference between the positions of the pixels corresponding to the largest signal values in the respective groups.

The position of the focal plane may also be detected by detecting the position of a pixel corresponding to the largest signal value in each of a group of focus detection pixels that collect light from the right section of the image-pickup optical system 210 and a group of focus detection pixels that collect light from the left section of the image-pickup optical system 210. The focus detection pixels that collect light from the right section of the image-pickup optical system 210 are the pixels labeled "RT" in FIG. 2, and the focus detection pixels that collect light from the left section of the image-pickup optical system 210 are the pixels labeled "LT" in FIG. 2.

The focus controller 418 controls the lens-driving mechanism 230 using the lens controller 240 on the basis of the position of the focal plane determined by the image-formation-position detector 420, and thereby adjusts the positions of the convex lens 212 and the concave lens 216 to in-focus positions.

The image processor 432 extracts digital signals corresponding to the image pickup pixels from the digital signals corresponding to all of the pixels and subjects the extracted digital signals to the color interpolation process and other processes, thereby producing image data. The image pickup controller 422 controls the liquid-crystal-display driving circuit 404 to cause the liquid crystal display 402 to display an image corresponding to the image data.

The charge signals output from the focus detection pixels that collect the light Lα and the charge signals output from the focus detection pixels that collect the light Lβ are examples of first charge signals described in the claims and second charge signals described in the claims, respectively, or vice versa. The signal charges output from the image pickup pixels in the image pickup device 500 are an example of third charge signals described in the claims.

Advantages of Present Embodiment

Thus, according to the first embodiment of the present invention, the low-refractive-index filter 550 and the high-refractive-index filter 560 are arranged next to each other so as to be opposed to the entire body of the photodiode 528 in each focus detection pixel. Accordingly, light that passes through the low-refractive-index filter 550 and light that passes through the high-refractive-index filter 560 after passing through the upper or lower section of the image-pickup optical system 210 have phases shifted from each other by 180°, and therefore interfere with each other so as to cancel each other.

Therefore, the focus detection pixels for detecting the light Lα and the focus detection pixels for detecting the light Lβ can be selectively formed simply by changing the position of the boundary between the low-refractive-index filter 550 and the high-refractive-index filter 560.

Therefore, it is not necessary to provide two photodiodes in a single focus detection pixel. Accordingly, it is also not necessary to form a separation area between the photodiodes. Since the pixel area can be effectively used, the opening area of the photodiode in the focus detection pixel can be increased compared to that in the related art. This increases the maximum accumulation amount of charges in the photodiode 528 in each focus detection pixel and the sensitivity of the focus detection pixel with respect to light. As a result, the accuracy of focus detection can be increased.

Each focus detection pixel is caused to detect only light from one of the upper, lower, left, and right sections of the image-pickup optical system 210. The four kinds of focus detection pixels corresponding to the four sections of the image-pickup optical system 210 are separately provided. Therefore, unlike the structure of the related art, it is not necessary to successively read charge signals from two photodiodes in each focus detection pixel. As a result, the speed of focus detection can be increased.

In addition, since each focus detection pixel has a simple structure in which the low-refractive-index filter 550 and the high-refractive-index filter 560 having different refractive indices are simply arranged, reduction in pixel size is not severely limited by the structure of the focus detection pixels.

Optical Materials of Low-Refractive-Index Filter and High-Refractive-Index Filter Table 1 shows optical materials that can be used to manufacture the low-refractive-index filter 550 and the high-refractive-index filter 560. The optical materials are listed in the descending order of refractive index with respect to green light. As a reference, the refractive index of silicon dioxide (SiO$_2$) that forms the silicon oxide film 530 is shown at the bottom row.

TABLE 1

| | Refractive Index (n) | | | Extinction Coefficient (k) | | |
|---|---|---|---|---|---|---|
| | Blue Light 450 nm | Green Light 550 nm | Red Light 650 nm | Blue Light 450 nm | Green Light 550 nm | Red Light 650 nm |
| Germanium | 4.5 | 6.0 | 5.5 | 2.3 | 2.1 | 1 |
| Silicon | 4.69 | 4.08 | 3.85 | 0.151 | 0.03 | 0.017 |
| Tungsten | 3.31 | 3.48 | 3.76 | 2.47 | 2.72 | 2.95 |
| Plasma Silicon Nitride | 2.07 | 2.04 | 2.01 | 0.004 | 0 | 0.002 |
| Aluminum | 0.618 | 0.958 | 1.47 | 5.47 | 6.69 | 7.79 |
| Copper | 1.17 | 0.9 | 0.21 | 2.39 | 2.6 | 3.67 |
| Reference: Silicon Dioxide | 1.45 | 1.45 | 1.45 | 0.00 | 0.00 | 0.00 |

Although not listed in Table 1, siloxane is another optical material that can be used to form the low-refractive-index filter 550 or the high-refractive-index filter 560. With regard to silicon, which is listed in Table 1, any one of single crystal silicon, amorphous silicon, and polysilicon may be used. Two optical materials having different refractive indices with which the film thickness d that satisfies Equation (1) can be set within a suitable range may be selected from Table 1 as the optical materials of the low-refractive-index filter 550 and the high-refractive-index filter 560.

The "suitable range" mentioned above is a thickness range such that the low-refractive-index filter 550 and the high-refractive-index filter 560 can be reliably manufactured in the manufacturing process of the image pickup device 500 and such that the light transmittance of the low-refractive-index filter 550 and the high-refractive-index filter 560 is high enough to ensure the light sensitivity of the focus detection pixel. This is because the transmittance decreases as the film thickness increases depending on the optical material. The transmittances of the optical materials with respect to light of each color can be determined on the basis of the extinction coefficient k shown in Table 1. This will be described in more detail below in a third embodiment.

Plasma silicon nitride (P—SiN) listed in Table 1 is simply an example of silicon nitride (Si$_3$N$_4$). Silicon nitride that can be used as a material of the low-refractive-index filter 550 or the high-refractive-index filter 560 is not limited to plasma silicon nitride.

Supplementary Explanation of Present Embodiment

According to the first embodiment, some of pixels of the three primary colors that are arranged in a Bayer pattern in the image pickup device 500 are used as the focus detection pixels. However, the present invention is not limited to this embodiment. The present invention may also be applied to the case in which the pixels are arranged in a so-called honeycomb pattern or the case in which pixels of complementary colors are arranged.

In the Bayer pattern, two pixels corresponding to the green light component are included in a unit of four pixels. Therefore, a focus detection pixel can be formed by changing a color filter included in one of the two pixels to a color filter that selectively transmits red or blue light. In such a case, focus detection can be accurately performed even when no green light is emitted from the object.

The area ratio between the low-refractive-index filter 550 and the high-refractive-index filter 560 will now be described. The focus detection pixel that collects the light Lα from the upper section of the image-pickup optical system 210 shown in FIG. 5A will be considered as an example. In this case, the ratio of the area in which the low-refractive-index filter 550 is opposed to the photodiode 528 to the area in which the high-refractive-index filter 560 is opposed to the photodiode 528 may be set to, for example, 3:1 when viewed in the optical axis direction of the microlens 522.

In this case, in the lower half of the photodiode 528 (that is, in the lower half of the area B 528b and the entire section of the area A 528a in FIG. 5A), the ratio between the areas in which the low-refractive-index filter 550 and the high-refractive-index filter 560 are opposed to the photodiode 528 is 1:1. Accordingly, half of the light that passes through the upper section of the image-pickup optical system 210 and that is incident on the focus detection pixel passes through the low-refractive-index filter 550, and the remaining half passes through the high-refractive-index filter 560. As a result, the light that passes through the low-refractive-index filter 550 and the light that passes through the high-refractive-index filter 560 cancel each other, and only the light from the lower section of the image-pickup optical system 210 can be collected. Thus, the intensity of light incident on the focus detection pixel can be easily adjusted simply by changing the position of the boundary between the low-refractive-index filter 550 and the high-refractive-index filter 560 or the area ratio between the low-refractive-index filter 550 and the high-refractive-index filter 560.

2. Second Embodiment

Camera systems according to second to seventh embodiments described below differ from the camera system according to the first embodiment only in the structures of the focus detection pixels included in the image pickup device. Therefore, only the difference from the first embodiment will be described.

Figure 9:
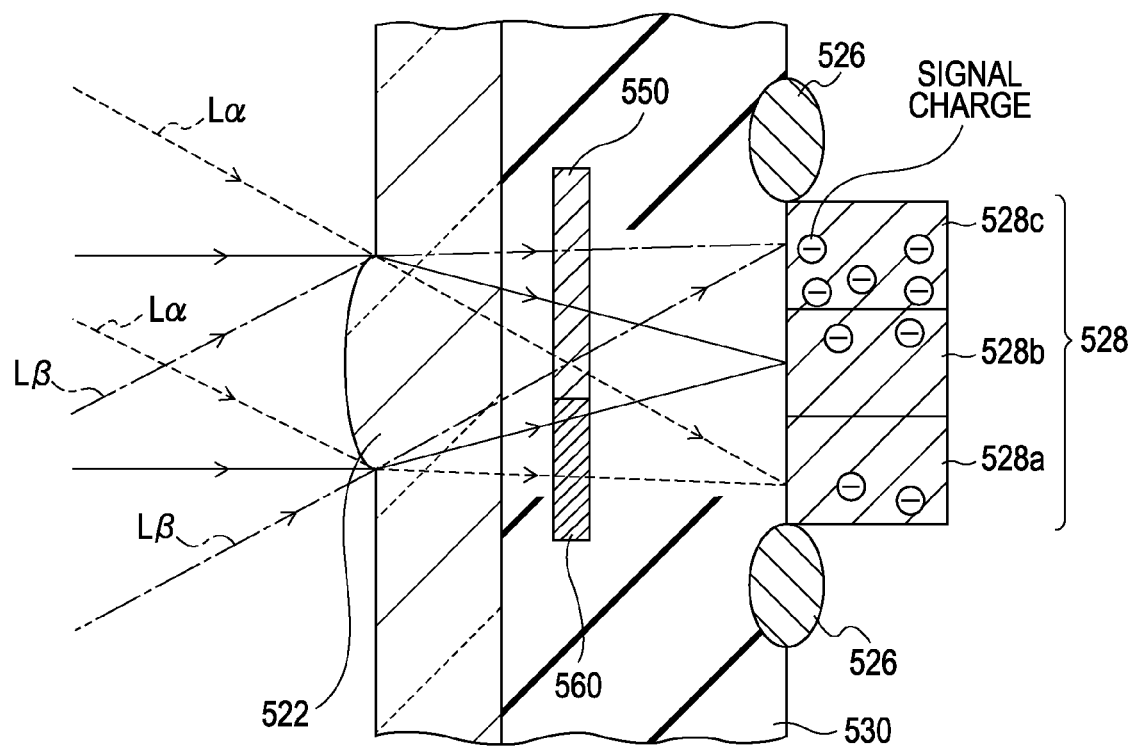
FIG. 9 is a schematic sectional view of a focus detection pixel in an image pickup device included in a camera system according to a second embodiment of the present invention.

FIG. 9 is a schematic sectional view of a focus detection pixel in an image pickup device included in the camera system according to the second embodiment. The focus detection pixel collets the light Lβ from the lower section of the image-pickup optical system 210. Although not shown in the figure, the focus detection pixel that collects the light Lα from the upper section of the image-pickup optical system 210 is structured such that the low-refractive-index filter 550 and the high-refractive-index filter 560 are arranged symmetrically to those shown in FIG. 9 with respect to the optical axis of the microlens 522.

As is clear from the comparison between FIGS. 9 and 5A, the second embodiment differs from the first embodiment in that the color filter 524 is removed. In this case, light with various wavelengths is incident on the focus detection pixel.

The refractive indices of the two kinds of optical materials that form the low-refractive-index filter 550 and the high-refractive-index filter 560 vary in accordance with the wavelength. In other words, as the wavelength range of the incident light increases, it becomes more difficult to accurately set the phase difference between the light that passes through the low-refractive-index filter 550 and the light that passes through the high-refractive-index filter 560 to 180°. Therefore, preferably, the color filter is provided as in the first embodiment. However, the effects similar to those of the first embodiment can also be obtained by the structure of the present embodiment.

3. Third Embodiment

Structure of Focus Detection Pixel

Although both the low-refractive-index filter 550 and the high-refractive-index filter 560 are used in the first and second embodiments, this is not necessary. If the phase difference between light that passes through the high-refractive-index filter 560 and light that does not pass through the high-refractive-index filter 560 can be set to 180° on the basis of the difference in refractive index between the high-refractive-index filter 560 and the silicon oxide film 530 surrounding the high-refractive-index filter 560, the low-refractive-index filter 550 can be omitted. Based on the similar principle, the structure may also be such that the high-refractive-index filter 560 is omitted and the phase difference is set to 180° using the low-refractive-index filter 550.

However, as is clear from Table 1, optical materials that are generally used in semiconductors and that have a relatively low refractive index do not have a large difference in refractive index from silicon dioxide, which forms the interlayer insulation film. In addition, many of optical materials having a large difference in refractive index from silicon dioxide have high extinction coefficients. Therefore, light incident on such an optical material does not reliably reach the photodiode 528. To ensure the light sensitivity of the focus detection pixel, an optical material having a low extinction coefficient is preferably selected.

Figure 10A:
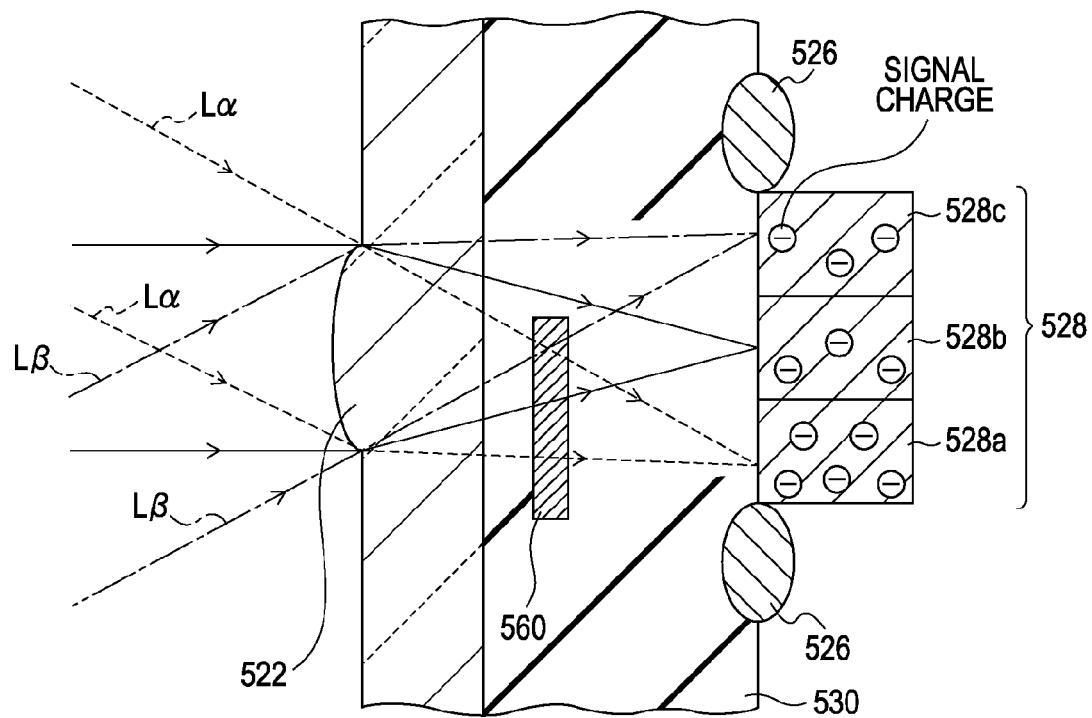
FIGS. 10A and 10B are schematic sectional views illustrating focus detection pixels that collect light from an upper section of an image-pickup optical system in an image pickup device included in a camera system according to a third embodiment of the present invention.
Figure 10B:
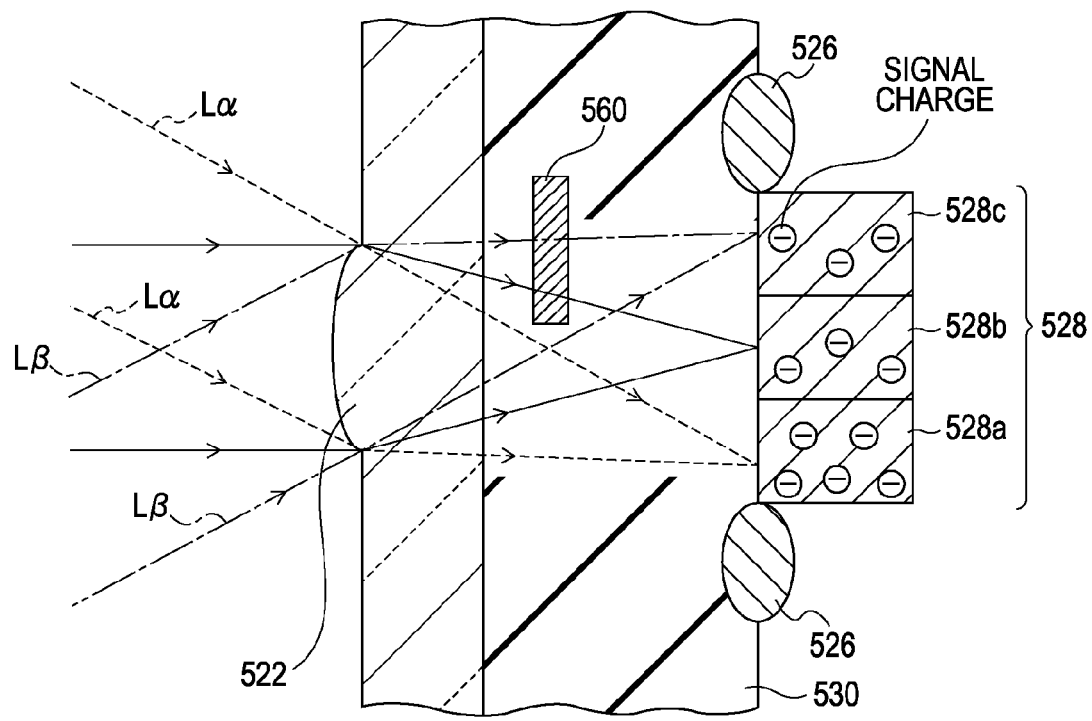

FIGS. 10A and 10B are schematic sectional views illustrating focus detection pixels that collect the light Lα from the upper section of the image-pickup optical system 210 in the image pickup device included in the camera system according to the third embodiment of the present invention. Either of the structures shown in FIGS. 10A and 10B may be applied.

FIG. 10A shows the structure in which the area in which the high-refractive-index filter 560 is opposed to the photodiode 528 is larger than half of the opening area of the photodiode 528 so that all of the light Lα from the upper section of the image-pickup optical system 210 passes through the high-refractive-index filter 560. FIG. 10B shows the structure in which the area in which the high-refractive-index filter 560 is opposed to the photodiode 528 is less than half of the opening area of the photodiode 528 so that none of the light Lα from the upper section of the image-pickup optical system 210 passes through the high-refractive-index filter 560.

In either of the above-described structures, only a part of the light Lβ from the lower section of the image-pickup optical system 210 passes through the high-refractive-index filter 560. In addition, in either of the above-described structures, an end of the high-refractive-index filter 560 close to the area B 528b of the photodiode 528 is positioned above the optical axis of the microlens 522.

The optical axis of the microlens 522 according to the present embodiment is an example of "axis that passes through the center of the photoelectric converter in the optical axis direction of the image-pickup optical system" described in the claims.

Figure 11A:
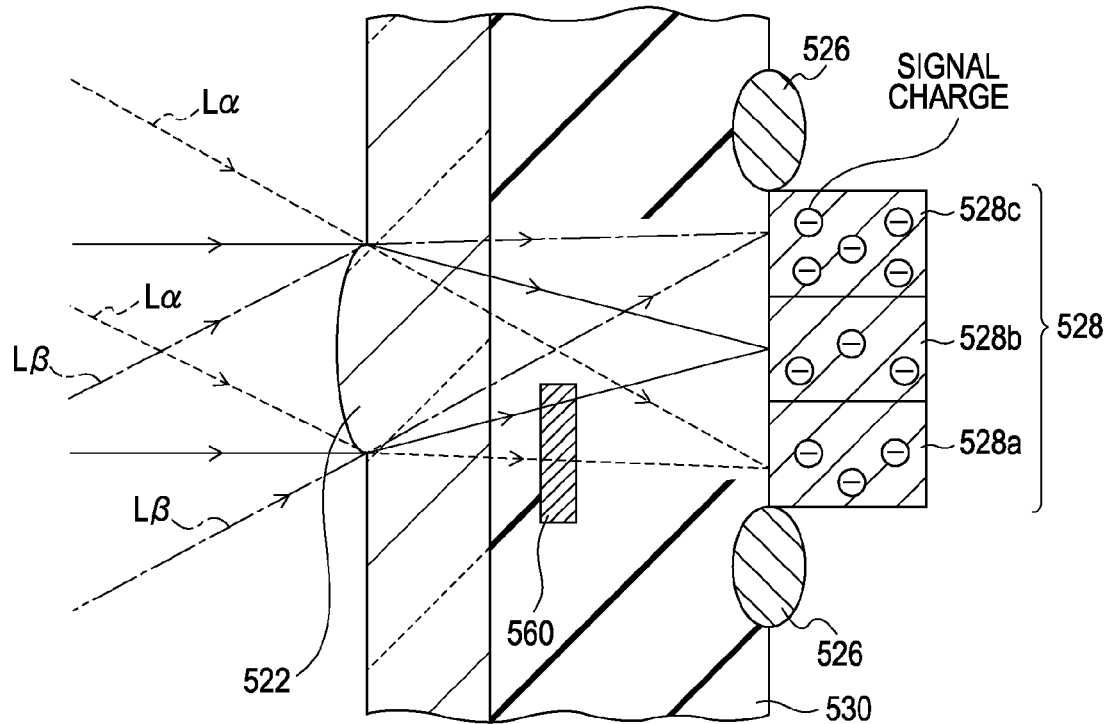
FIGS. 11A and 11B are schematic sectional views illustrating focus detection pixels that collect light from a lower section of the image-pickup optical system in the image pickup device included in the camera system according to the third embodiment of the present invention.
Figure 11B:
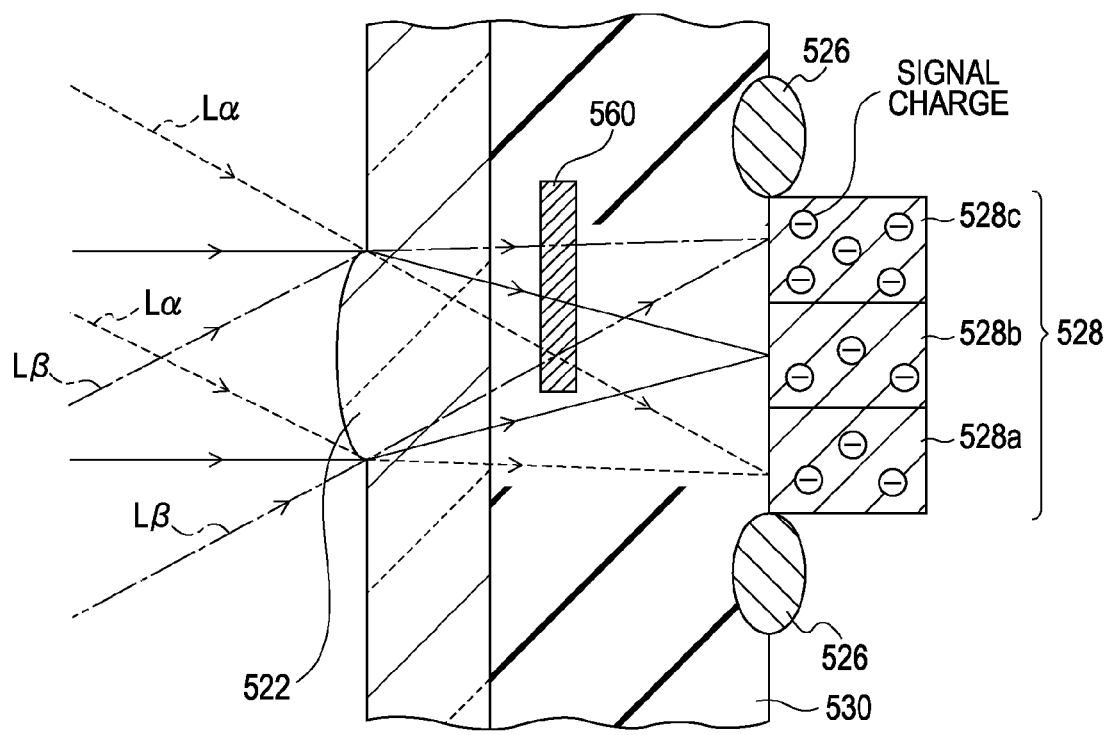

FIGS. 11A and 11B are schematic sectional views illustrating focus detection pixels that collect the light Lβ from the lower section of the image-pickup optical system 210 in the image pickup device included in the camera system according to the third embodiment of the present invention. Either of the structures shown in FIGS. 11A and 11B may be applied.

FIG. 11A shows the structure in which the area in which the high-refractive-index filter 560 is opposed to the photodiode 528 is less than half of the opening area of the photodiode 528 so that none of the light Lβ from the lower section of the image-pickup optical system 210 passes through the high-refractive-index filter 560. FIG. 11B shows the structure in which the area in which the high-refractive-index filter 560 is opposed to the photodiode 528 is larger than half of the opening area of the photodiode 528 so that all of the light Lβ from the lower section of the image-pickup optical system 210 passes through the high-refractive-index filter 560.

In either of the above-described structures, only a part of the light Lα from the upper section of the image-pickup optical system 210 passes through the high-refractive-index filter 560. In addition, in either of the above-described structures, an end of the high-refractive-index filter 560 close to the area B 528b of the photodiode 528 is positioned below the optical axis of the microlens 522.

Optical Material of High-Refractive-Index Filter and Transmittance

In the case where the high-refractive-index filter 560 included in each of the focus detection pixels shown in FIGS. 10A, 10B, 11A, and 11B is made of plasma silicon nitride, the film thickness d at which the phase difference between light that passes through the high-refractive-index filter 560 and light that does not pass through the high-refractive-index filter 560 can be set to 180° can be obtained as follows. That is, the film thickness d can be obtained by substituting the refractive index of plasma silicon nitride, the refractive index of the silicon dioxide that forms the silicon oxide film 530 surrounding the high-refractive-index filter 560, and the wavelength of green light (550 nm) into Equation (1) as follows:

$$d = \lambda / \{(n2 - n1) \times 2\}$$
$$= 550 / \{(2.04 - 1.45) \times 2\} = 466 \text{ nm}$$

As shown in Table 1, the extinction coefficient k of plasma silicon nitride with respect to green light is substantially 0. Therefore, substantially all of the light that is incident on the high-refractive-index filter 560 passes therethrough and reaches the photodiode 528. Thus, the light sensitivity of the focus detection pixel is not reduced by the presence of the high-refractive-index filter 560 and no practical problem is caused by the high-refractive-index filter 560.

As another example, the transmittance obtained when the high-refractive-index filter 560 is made of silicon will be described. In this case, the film thickness d at which the phase difference can be set to 180° for green light is obtained by a similar method as follows:

$$d = \lambda / \{(n2 - n1) \times 2\}$$
$$= 550 / \{(4.08 - 1.45) \times 2\} = 104.5 \text{ nm}$$

As shown in Table 1, the extinction coefficient k of silicon with respect to green light is 0.03. Therefore, in the case where the film thickness d of the high-refractive-index filter 560 is set to 104.5 nm as described above, the transmittance (reflection is ignored) of the high-refractive-index filter 560 for green light can be obtained as follows:

$$I/Io = \exp\{-4 \times \pi \times k \times (d/\lambda)\}$$
$$= \exp\{-4 \times \pi \times 0.03 \times (104.5/550)\} = 0.93$$

where Io is the incident light intensity and I is the transmitted light intensity.

Similarly, the film thickness d at which the phase difference can be set to 180° for blue light (wavelength 450 nm, which is hereinafter omitted) and the transmittance (reflection is ignored) for blue light corresponding to the film thickness d are obtained as follows:

$$d=450/\{(4.69-1.45)\times 2\}=69.4 \text{ nm}$$

$$I/Io=\exp\{-4\times\pi\times 0.151\times(69.4/450)\}=0.746$$

Similarly, the film thickness d at which the phase difference can be set to 180° for red light (wavelength 650 nm, which is hereinafter omitted) and the transmittance (reflection is ignored) for red light corresponding to the film thickness d are obtained as follows:

$$d=650/\{(3.85-1.45)\times 2\}=135.4 \text{ nm}$$

$$I/Io=\exp\{-4\times\pi\times 0.017\times(135.4/650)\}=0.956$$

Therefore, if green light, blue light, or red light is incident on the high-refractive-index filter 560 having the above-described corresponding thickness d, 93% of the green light, 74.6% of the blue light, or 95.6% of the red light, respectively, passes through the high-refractive-index filter 560 and reaches the photodiode 528. If the transmittance is around any of the above-described values, the light sensitivity of the focus detection pixel is not reduced by the presence of the high-refractive-index filter 560 and no practical problem is caused by the high-refractive-index filter 560.

Modification of Third Embodiment

In the case where silicon is used as the material of the high-refractive-index filter 560, there is a risk that the reflectance will be increased at the silicon surface and the amount of light that reaches the photodiode 528 will be reduced accordingly. In such a case, a high-refractive-index filter 561 may be formed by stacking a plurality of films made of optical materials, for example, by forming an antireflection film 563 on the silicon surface to reduce the reflectance. Such a modification of the third embodiment will be described with reference to FIGS. 12A and 12B.

Figure 12A:
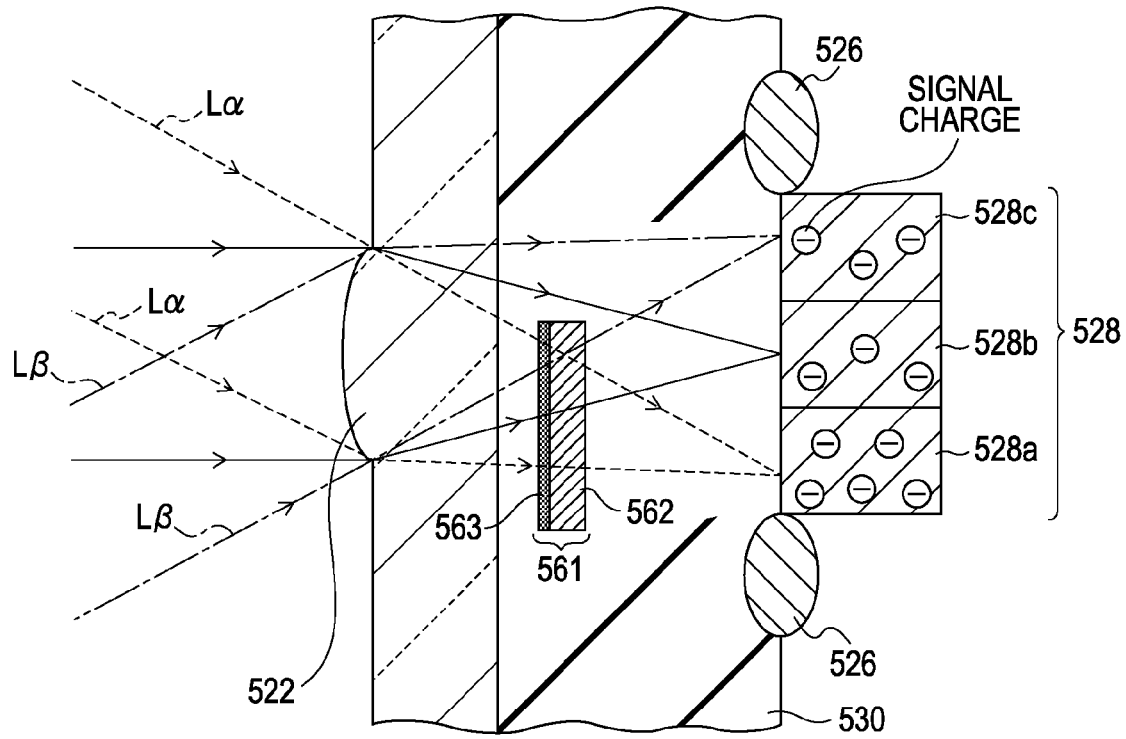
FIGS. 12A and 12B are schematic sectional views illustrating the structures in which antireflection films are provided on the surfaces of high-refractive-index filters in the focus detection pixels according to the third embodiment of the present invention.

FIG. 12A is a schematic sectional view of a focus detection pixel including the high-refractive-index filter 561 having a layered structure including the above-described antireflection film 563. The focus detection pixel collects the light Lα from the upper section of the image-pickup optical system 210. The focus detection pixel has the same structure as that shown in FIG. 10A except that the antireflection film 563 is provided on the surface of the high-refractive-index filter 561.

As shown in FIG. 12A, the high-refractive-index filter 561 includes a high-refractive-index filter layer 562 and the antireflection film 563 provided on the surface of the high-refractive-index filter layer 562 facing the microlens 522. The high-refractive-index filter layer 562 is shown by lines inclined upward toward the right, and the antireflection film 563 is shown by a gray area represented by small dots.

The high-refractive-index filter layer 562 is provided to set the phase difference between light that passes therethrough and light that does not pass therethrough but passes through the silicon oxide film 530 surrounding the high-refractive-index filter layer 562 to 180°. In other words, the refractive index of the optical material that forms the high-refractive-index filter layer 562 and the film thickness d of the high-refractive-index filter layer 562 satisfy Equation (1). The antireflection film 563 may be made of, for example, silicon nitride ($Si_3N_4$). The reflectance of the silicon nitride ($Si_3N_4$) film varies in accordance with the thickness thereof and the wavelength of incident light. Therefore, the film thickness d is preferably set such that the reflectance can be reduced in accordance with the wavelength of the incident light. The antireflection film 563 is an example of a film made of an optical material described in the claims. The silicon oxide film 530 is an example of an optical layer described in the claims.

Figure 12B:
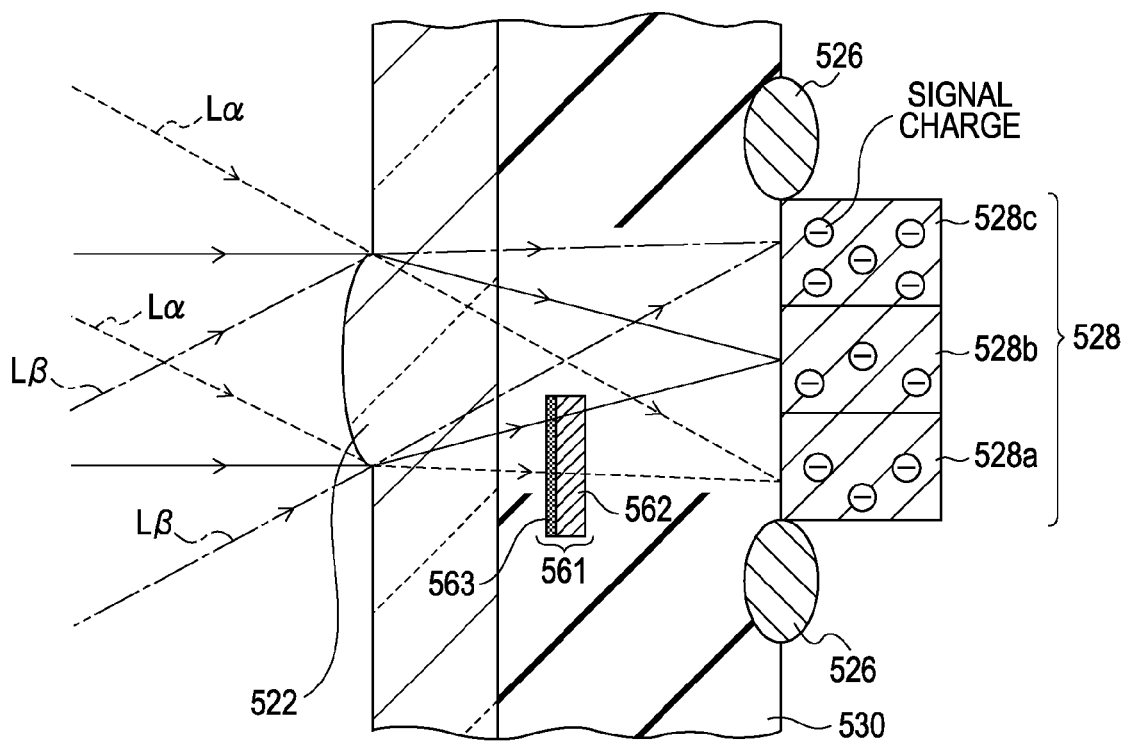

FIG. 12B is a schematic sectional view of a focus detection pixel that collects the light Lβ from the lower section of the image-pickup optical system 210 in the above-described structure including the antireflection film 563. The difference of the focus detection pixel shown in FIG. 12B from that shown in FIG. 12A is that the area in which the high-refractive-index filter 561 is opposed to the photodiode 528 is smaller than half of the opening area of the photodiode 528. More specifically, in the focus detection pixel shown in FIG. 12B, none of the light Lβ from the lower section of the image-pickup optical system 210 passes through the high-refractive-index filter 561, and only a part of the light Lα from the upper section of the image-pickup optical system 210 passes through the high-refractive-index filter 561.

The third embodiment also provides the effects similar to those of the first embodiment. Although no color filter is provided in the present embodiment, a color filter may also be provided to limit the wavelength range of the incident light, as in the first embodiment.

Figure 13A:
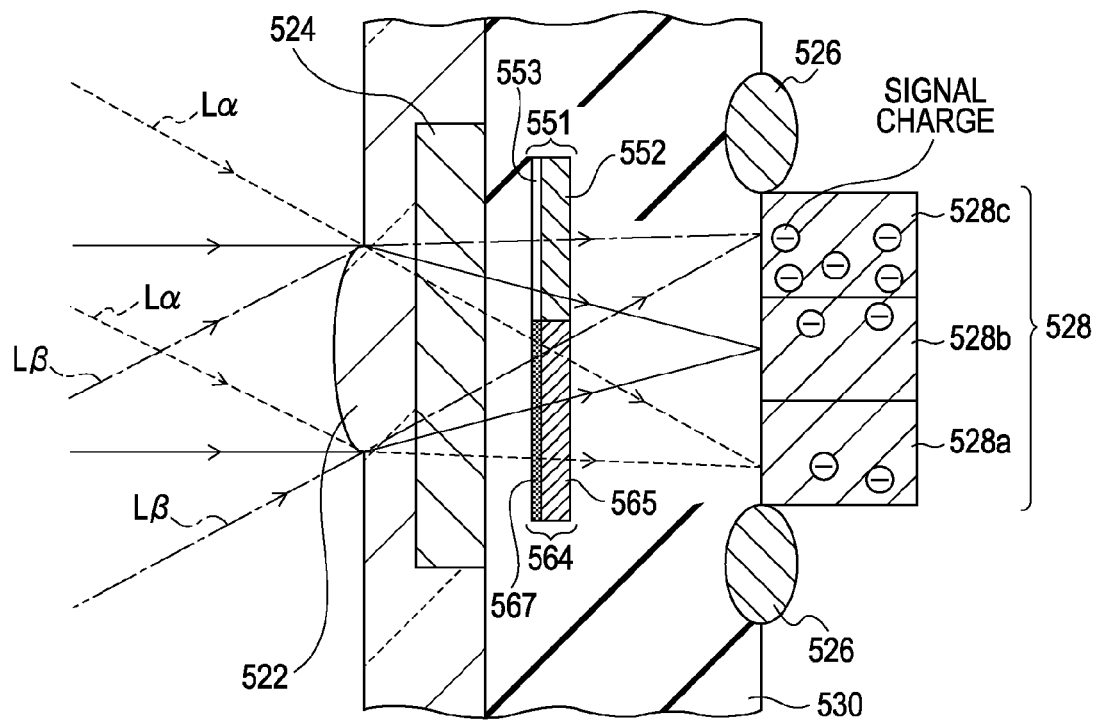
FIGS. 13A and 13B are schematic sectional views illustrating the structures in which antireflection films are provided on the surfaces of the low-refractive-index filters and the high-refractive-index filters in the focus detection pixels according to the first embodiment of the present invention.
Figure 13B:
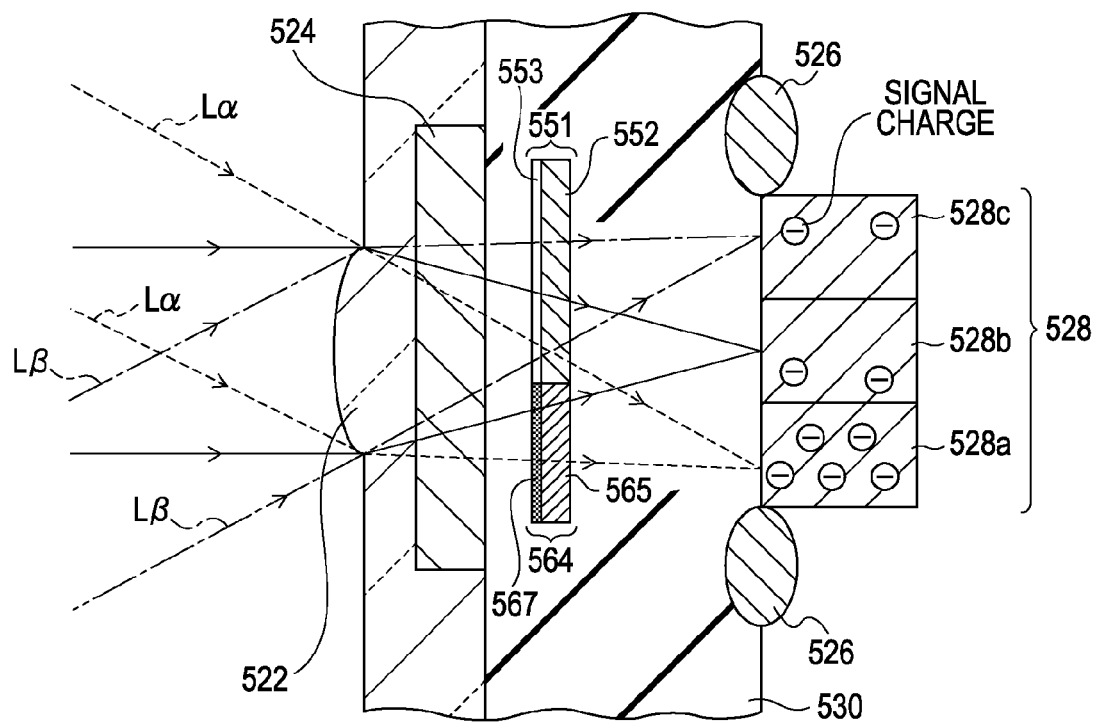

The antireflection film 563 may also be applied to the case in which both the low-refractive-index filter 550 and the high-refractive-index filter 560 are provided as in the first embodiment, and FIGS. 13A and 13B show an example of such a structure. FIG. 13A is a schematic sectional view of a focus detection pixel that collects the light Lα from the upper section of the image-pickup optical system 210. FIG. 13B is a schematic sectional view of a focus detection pixel that collects the light Lβ from the lower section of the image-pickup optical system 210. The focus detection pixels shown in FIGS. 13A and 13B differ from those of the first embodiment shown in FIGS. 5A and 7A only in the structures of a low-refractive-index filter 551 and a high-refractive-index filter 564.

Referring to FIG. 13A, the low-refractive-index filter 551 includes a low-refractive-index filter layer 552 and an antireflection film 553 provided on the surface of the low-refractive-index filter layer 552 facing the microlens 522. In FIG. 13A, the low-refractive-index filter layer 552 is shown by lines inclined downward toward the right, and the antireflection film 553 is shown by a blank area. The high-refractive-index filter 564 includes a high-refractive-index filter layer 565 and an antireflection film 567 provided on the surface of the high-refractive-index filter layer 565 facing the microlens 522. In FIG. 13A, the high-refractive-index filter layer 565 is shown by lines inclined upward toward the right, and the antireflection film 567 is shown by a gray area represented by small dots.

The low-refractive-index filter 551 and the high-refractive-index filter 564 are arranged next to each other such that no step is formed between the surfaces of the antireflection films 553 and 567 that face the microlens 522. The low-refractive-index filter layer 552 and the high-refractive-index filter layer 565 have the same thickness, and the antireflection film 553 and the antireflection film 567 also have the same thickness. Thus, the low-refractive-index filter layer 552 and the high-refractive-index filter layer 565 are disposed such that no step is formed between the surfaces thereof that face the photodiode 528. This is because if there is a step between the surfaces, the optical path changes at the step and it may become difficult to reliably provide the function of collecting only the light $L\alpha$ from the upper section of the image-pickup optical system 210.

The optical materials and the thickness of the low-refractive-index filter layer 552 and the high-refractive-index filter layer 565 are determined such that the phase difference between the light that passes through the low-refractive-index filter layer 552 and the light that passes through the high-refractive-index filter layer 565 is set to 180° on the basis of Equation (1). Similar to the above-described example, the antireflection films 553 and 567 may be made of, for example, silicon nitride ($Si_3N_4$). The color filter 524 included in the focus detection pixel shown in FIG. 13A selectively transmits green light. Therefore, the thickness of the antireflection films 553 and 567 is preferably set such that the reflectance for the wavelength range around the wavelength of green light can be reduced.

The positions of the low-refractive-index filter 551 and the high-refractive-index filter 564 with respect to the optical axis of the microlens 522 and the photodiode 528 are similar to those described in the first embodiment. More specifically, the boundary between the low-refractive-index filter 551 and the high-refractive-index filter 564 is positioned above the optical axis of the microlens 522 in FIG. 13A.

Conversely, the boundary between the low-refractive-index filter 551 and the high-refractive-index filter 564 is positioned below the optical axis of the microlens 522, as shown in FIG. 13B, to form the focus detection pixel that collects the light $L\beta$ from the lower section of the image-pickup optical system 210.

4. Fourth Embodiment

Figure 14:
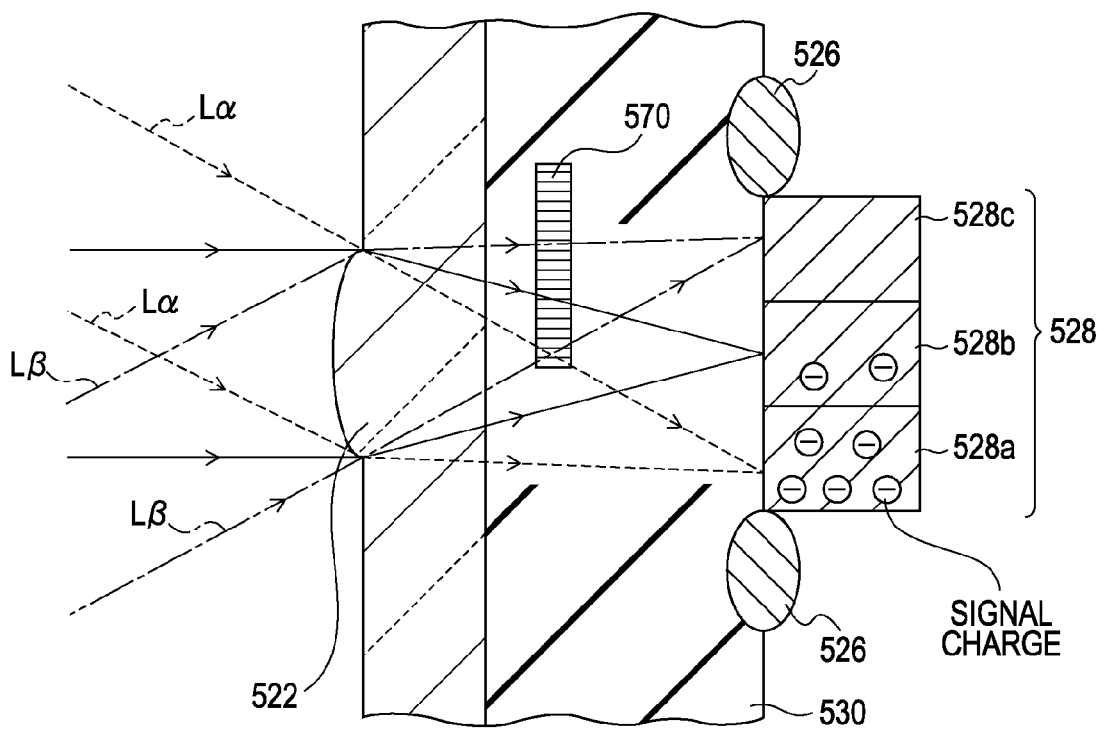
FIG. 14 is a schematic sectional view of a focus detection pixel in an image pickup device included in a camera system according to a fourth embodiment of the present invention.

FIG. 14 is a schematic sectional view of a focus detection pixel in an image pickup device included in a camera system according to a fourth embodiment of the present invention. The focus detection pixel shown in FIG. 14 collects the light $L\alpha$ from the upper section of the image-pickup optical system 210. The fourth embodiment differs from the third embodiment only in that a laminated filter 570 is provided in place of the high-refractive-index filter 560.

The laminated filter 570 is formed by alternately stacking layers made of two kinds of optical materials having different refractive indices such that boundary surfaces between the layers are parallel to the optical axis of the microlens 522, that is, such that the normal line of lamination surfaces is perpendicular to the optical axis direction of the microlens 522.

The laminated filter 570 is positioned such that the area in which the laminated filter 570 is opposed to the area B 528b of the photodiode 528 is minimized when viewed in the optical axis direction of the microlens 522 under the condition that all of the light $L\beta$ from the lower section of the image-pickup optical system 210 passes through the laminated filter 570. Most part of the light $L\beta$ from the lower section of the image-pickup optical system 210 is incident on the laminated filter 570 in a direction inclined with respect to the optical axis of the microlens 522. The incident light passes through both of the layers made of an optical material having a high refractive index and the layers made of an optical material having a low refractive index in the laminated filter 570.

Accordingly, a phase difference is caused in the light $L\beta$ from the lower section of the image-pickup optical system 210 as the light $L\beta$ passes through the layers having different refractive indices in the laminated filter 570, and is reduced by interference by the time the light $L\beta$ reaches the photodiode 528. Therefore, when the overall thickness of the laminated filter 570 (thickness in the optical axis direction of the microlens 522) is d, the optical materials of the two kinds of layers are preferably selected so as to satisfy Equation (1). In the present embodiment, owing to the above-described structure, the phase difference in the transmitted light is close to 180°. Therefore, the light $L\beta$ from the lower section of the image-pickup optical system 210 can be reliably reduced.

The light $L\alpha$ from the upper section of the image-pickup optical system 210 does not pass through the laminated filter 570 except for an area around the optical axis of the microlens 522. Accordingly, the light $L\alpha$ is mainly collected at the area C 528c of the photodiode 528. Thus, the focus detection pixel shown in FIG. 14 serves to collect the light $L\alpha$ from the upper section of the image-pickup optical system 210.

Although not shown in the figure, a focus detection pixel that collects the light $L\beta$ from the lower section of the image-pickup optical system 210 is structured such that the laminated filter 570 is arranged symmetrically to that in the pixel structure shown in FIG. 14 with respect to the optical axis of the microlens 522. In other words, the laminated filter 570 is disposed such that the laminated filter 570 is opposed to the lower half of the area B 528b and the area A 528a of the photodiode 528. The present embodiment also provides the effects similar to those of the first embodiment.

Although no color filter is provided in the present embodiment, a color filter may also be provided to limit the wavelength range of the incident light, as in the first embodiment.

In addition, although the laminated filter 570 is composed of layers made of two kinds of optical materials having different refractive indices, the laminated filter 570 may instead be composed of layers made of three or more kinds of optical materials having different refractive indices as long as a phase difference of about 180° can be caused in the transmitted light.

The laminated filter 570 is an example of an optical member described in the claims.

5. Fifth Embodiment

Figure 15:
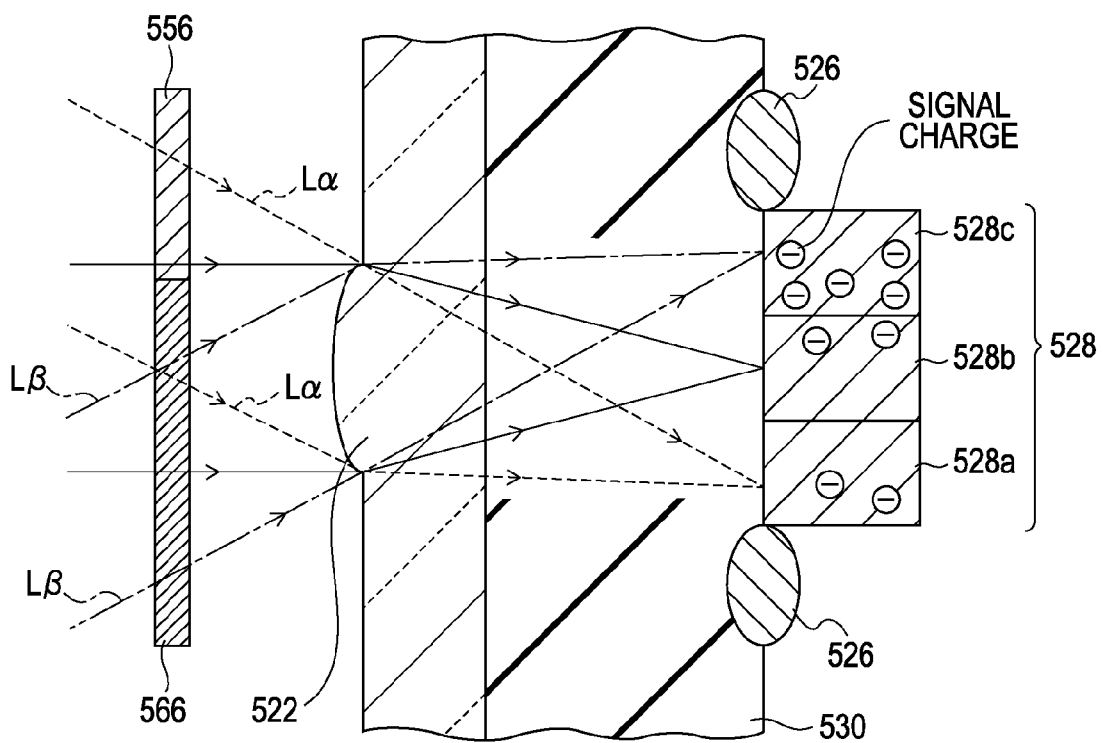
FIG. 15 is a schematic sectional view of a focus detection pixel in an image pickup device included in a camera system according to a fifth embodiment of the present invention.

FIG. 15 is a schematic sectional view of a focus detection pixel in an image pickup device included in a camera system according to a fifth embodiment of the present invention. The fifth embodiment differs from the second embodiment in that a low-refractive-index filter 556 and a high-refractive-index filter 566 are disposed at a side of the microlens 522 opposite the silicon oxide film 530. Since the low-refractive-index filter 556 and the high-refractive-index filter 566 are disposed closer to the image-pickup optical system 210 than the microlens 522 having a light collecting function, the sizes of the low-refractive-index filter 556 and the high-refractive-index filter 566 are preferably larger than those in the second embodiment.

The focus detection pixel shown in FIG. 15 collects the light $L\beta$ from the lower section of the image-pickup optical system 210. The boundary between the low-refractive-index filter 556 and the high-refractive-index filter 566 is above the optical axis of the microlens 522. Although not shown in the figure, a focus detection pixel that collects the light Lα from the upper section of the image-pickup optical system 210 is structured such that the low-refractive-index filter 556 and the high-refractive-index filter 566 are arranged symmetrically to those in the pixel structure shown in FIG. 15 with respect to the optical axis of the microlens 522.

The present embodiment also provides the effects similar to those of the first embodiment. Although no color filter is provided in the present embodiment, a color filter may also be provided to limit the wavelength range of the incident light, as in the first embodiment.

6. Sixth Embodiment

Figure 16:
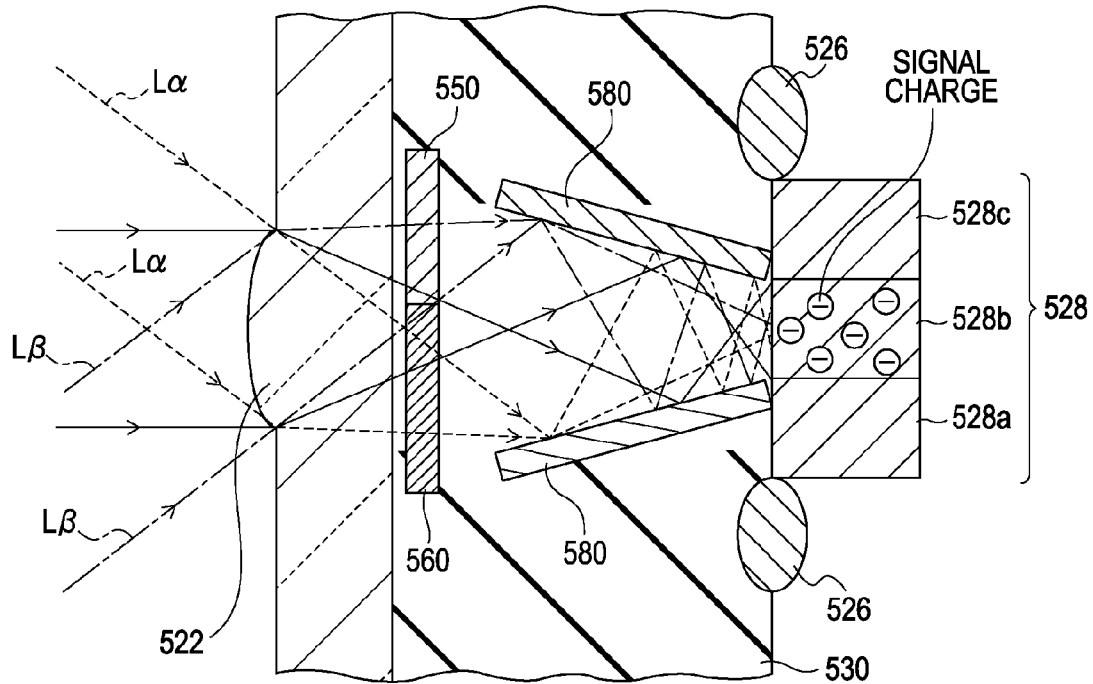
FIG. 16 is a schematic sectional view of a focus detection pixel in an image pickup device included in a camera system according to a sixth embodiment of the present invention.

FIG. 16 is a schematic sectional view of a focus detection pixel in an image pickup device included in a camera system according to a sixth embodiment of the present invention. The sixth embodiment differs from the first embodiment shown in FIG. 7A in that the color filter 524 is removed and a waveguide member 580 is provided.

The waveguide member 580 is disposed between the unit including the low-refractive-index filter 550 and the high-refractive-index filter 560 and the photodiode 528. Although only the sectional view of the waveguide member 580 is shown in FIG. 16, the waveguide member 580 actually has a hollow shape in which the opening diameter thereof is large at the microlens-522 side and small at the photodiode-528 side. The opening area of the waveguide member 580 at the microlens-522 side is preferably set such that all of light from the microlens 522 enters the waveguide member 580, as in the present embodiment. In such a case, the light sensitivity of the focus detection pixel can be increased. The waveguide member 580 has an inner surface made of an optical material having high reflectance, and guides the light that passes through the low-refractive-index filter 550 and the high-refractive-index filter 560 mainly toward the area B 528b of the photodiode 528 by reflection.

The boundary between the low-refractive-index filter 550 and the high-refractive-index filter 560 is positioned such that all of the light Lα passes through the high-refractive-index filter 560 without passing through the low-refractive-index filter 550 and the light Lβ passes through both the low-refractive-index filter 550 and the high-refractive-index filter 560.

The light Lα from the upper section of the image-pickup optical system 210 passes through only the high-refractive-index filter 560, so that no phase difference occurs in the transmitted light. Therefore, the light Lα is reflected by the inner surface of the waveguide member 580 and reaches the area B 528b of the photodiode 528 without being reduced by interference.

The light Lβ passes through both the low-refractive-index filter 550 and the high-refractive-index filter 560, so that a phase difference of 180° occurs. The light Lβ is reflected several times by the inner surface of the waveguide member 580 before reaching the photodiode 528. Therefore, the optical path to the photodiode 528 is longer than that in the first embodiment. Since the optical path is longer, the amount by which the light Lβ is reduced by interference is larger than that in the first embodiment. Therefore, substantially none of the light Lβ from the lower section of the image-pickup optical system 210 reaches the photodiode 528. As a result, the focus detection pixel shown in FIG. 16 collects the light Lα from the upper section of the image-pickup optical system 210.

Although not shown in the figure, a focus detection pixel that collects the light Lβ from the lower section of the image-pickup optical system 210 is structured such that the low-refractive-index filter 550 and the high-refractive-index filter 560 are arranged symmetrically to those in the pixel structure shown in FIG. 16 with respect to the optical axis of the microlens 522.

The present embodiment also provides the effects similar to those of the first embodiment.

Although no color filter is provided in the present embodiment, a color filter may also be provided to limit the wavelength range of the incident light, as in the first embodiment.

The technical idea of the present embodiment is to increase the optical path of the light from the microlens 522 by reflection by the inner surface of the waveguide member 580, so that the interference of the light having a phase difference can be increased. Therefore, the waveguide member 580 is preferably shaped such that the opening diameter thereof is large at the microlens-522 side and small at the photodiode-528 side. In such a case, the light that passes through the microlens 522 is collected at a local area in the photodiode 528. This area is not limited to the area B 528b as in the present embodiment, and may instead be the area A 528a or the area C 528c.

7. Seventh Embodiment

Figure 17:
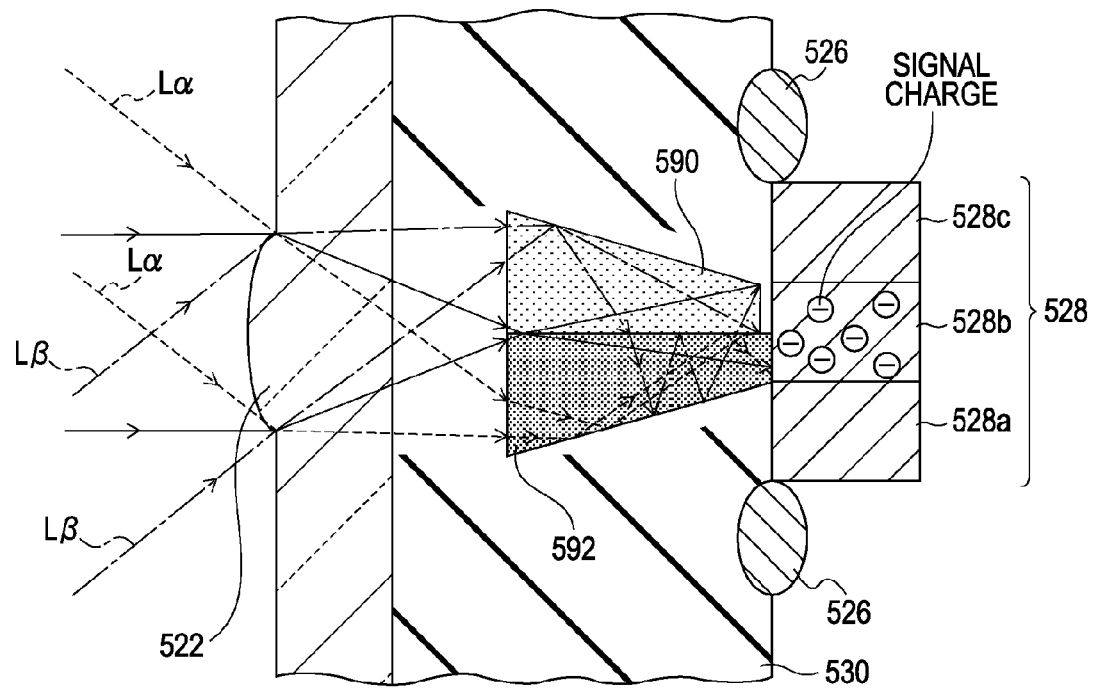
FIG. 17 is a schematic sectional view of a focus detection pixel in an image pickup device included in a camera system according to a seventh embodiment of the present invention.
Figure 18:
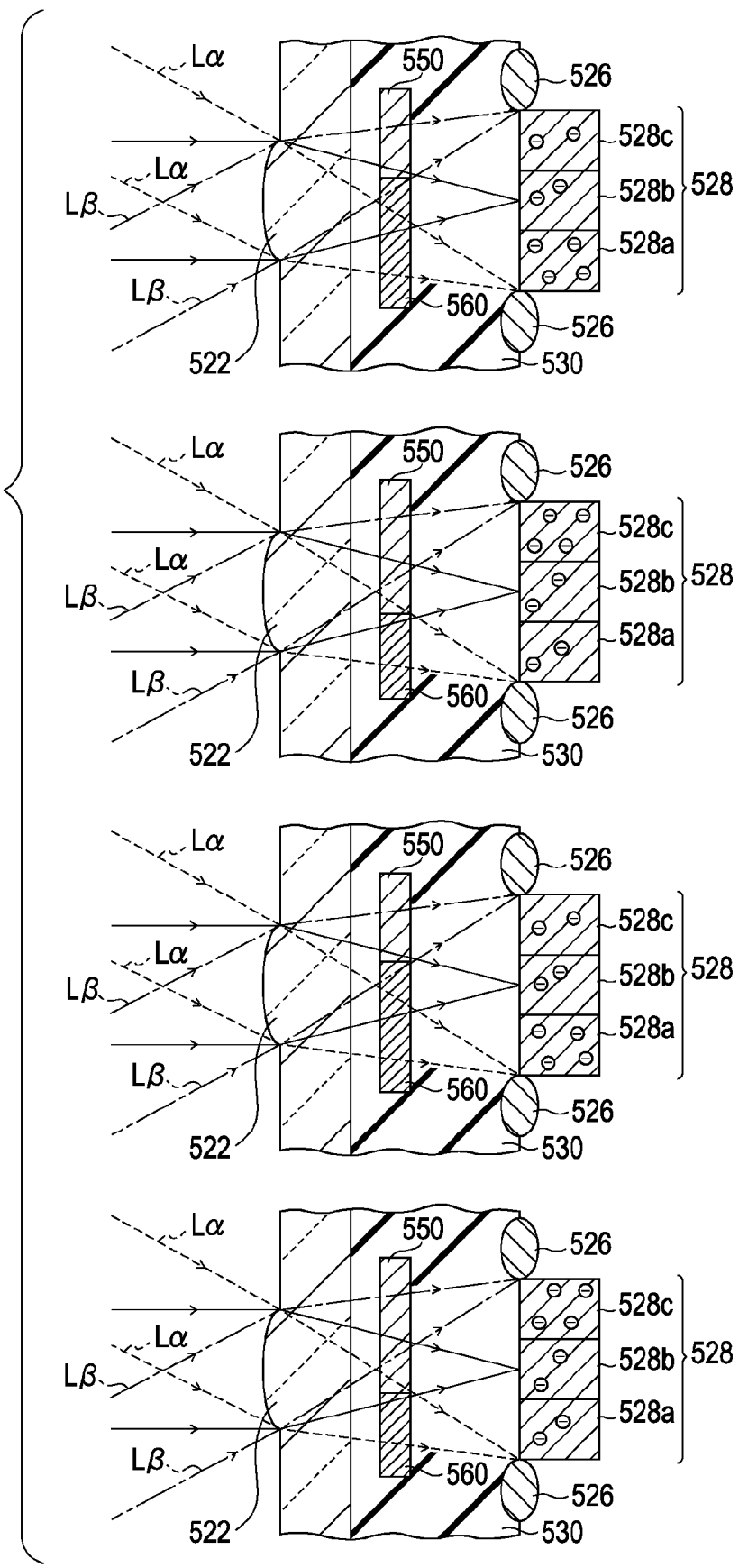
FIG. 18 is a schematic sectional view illustrating a first example of arrangement of the refractive filters in four focus detection pixels that collect light from the upper and lower sections of the image-pickup optical system according to the embodiments of the present invention.

FIG. 17 is a schematic sectional view of a focus detection pixel in an image pickup device included in a camera system according to a seventh embodiment of the present invention. The seventh embodiment differs from the first embodiment in that an intermediate-refractive-index waveguide 590 and a high-refractive-index waveguide 592 are provided in place of the low-refractive-index filter 550 and the high-refractive-index filter 560, and the color filter 524 is removed.

The intermediate-refractive-index waveguide 590 and the high-refractive-index waveguide 592 have substantially the same shape with a trapezoidal cross section and are in close contact with each other. The boundary between the intermediate-refractive-index waveguide 590 and the high-refractive-index waveguide 592 is positioned on the optical axis of the microlens 522. The silicon oxide film 530 is provided between the intermediate-refractive-index waveguide 590 and the photodiode 528, but is not provided between the high-refractive-index waveguide 592 and the photodiode 528.

The cross section of each of the intermediate-refractive-index waveguide 590 and the high-refractive-index waveguide 592 is large at the microlens-522 side and small at the photodiode-528 side. The cross section of each of the intermediate-refractive-index waveguide 590 and the high-refractive-index waveguide 592 at the microlens-522 side is preferably large enough to allow all of light from the microlens 522 to enter the intermediate-refractive-index waveguide 590 or the high-refractive-index waveguide 592, as in the present embodiment. In such a case, the light sensitivity of the focus detection pixel can be increased.

The high-refractive-index waveguide 592 guides the light Lα from the upper section of the image-pickup optical system 210 mainly toward the area B 528b of the photodiode 528 by internal reflection. In general, when light travels from a medium with a low refractive index to a medium with a high refractive index, a part of the light that is incident on the medium with a high refractive index is larger than a part of the light that is reflected by the boundary between the two media. Conversely, when light travels from a medium with a high refractive index to a medium with a low refractive index, a part of the light that is reflected by the boundary between the two media is larger than a part of the light that is incident on the medium with a low refractive index. Accordingly, in the present embodiment, the refractive index is higher in the order of silicon that forms the photodiode 528, the high-refractive-index waveguide 592, the intermediate-refractive-index waveguide 590, and the silicon oxide film 530.

Therefore, in FIG. 17, the light Lα from the upper section of the image-pickup optical system 210 is incident on the high-refractive-index waveguide 592 from the silicon oxide film 530 and reaches the photodiode 528 substantially without leaking to the outside of the high-refractive-index waveguide 592.

This is because the refractive index of the high-refractive-index waveguide 592 is higher than those of the silicon oxide film 530 and the intermediate-refractive-index waveguide 590 and therefore the light Lα is repeatedly reflected by the boundary between the high-refractive-index waveguide 592 and the silicon oxide film 530 and the boundary between the high-refractive-index waveguide 592 and the intermediate-refractive-index waveguide 590.

The light Lβ from the lower section of the image-pickup optical system 210 is incident on the intermediate-refractive-index waveguide 590 from the silicon oxide film 530, which has a relatively low refractive index. Then, the light Lβ is reflected by the boundary between the silicon oxide film 530 and the intermediate-refractive-index waveguide 590 and is incident on the high-refractive-index waveguide 592. Then, the light Lα that is directly incident on the high-refractive-index waveguide 592 from the silicon oxide film 530 and the light Lβ that is incident on the high-refractive-index waveguide 592 after passing through the silicon oxide film 530 and the intermediate-refractive-index waveguide 590 reduce each other, owing to the interference caused by the phase difference therebetween.

In this structure, first, a part of the light Lβ from the lower section of the image-pickup optical system 210 that is incident on the intermediate-refractive-index waveguide 590 from the silicon oxide film 530 is reflected by the boundary between the intermediate-refractive-index waveguide 590 and the high-refractive-index waveguide 592 and is not incident on the high-refractive-index waveguide 592. Second, the light Lβ that is incident on the high-refractive-index waveguide 592 after passing through the silicon oxide film 530 and the intermediate-refractive-index waveguide 590 has a longer optical path compared to the light Lα that is directly incident on the high-refractive-index waveguide 592 from the silicon oxide film 530, and therefore the intensity of the light Lβ is reduced by a larger amount.

Considering the above-described two points, the amount and intensity of the light Lα that is directly incident on the high-refractive-index waveguide 592 from the silicon oxide film 530 are larger than those of the light Lβ that is incident on the high-refractive-index waveguide 592 after passing through the intermediate-refractive-index waveguide 590. Therefore, the light Lβ is reduced by interference and does not reach the photodiode 528, and only the light Lα reaches the photodiode 528. As a result, the focus detection pixel shown in FIG. 17 selectively collects the light Lα from the upper section of the image-pickup optical system 210.

Although not shown in the figure, a focus detection pixel that collects the light Lβ from the lower section of the image-pickup optical system 210 is structured such that the intermediate-refractive-index waveguide 590 and the high-refractive-index waveguide 592 are arranged symmetrically to those in the pixel structure shown in FIG. 17 with respect to the optical axis of the microlens 522.

The present embodiment also provides the effects similar to those of the first embodiment.

The intermediate-refractive-index waveguide 590 is an example of a first waveguide described in the claims. The high-refractive-index waveguide 592 is an example of a second waveguide described in the claims. The silicon oxide film 530 is an example of an optical layer described in the claims.

With regard to the optical materials of the intermediate-refractive-index waveguide 590 and the high-refractive-index waveguide 592, two types of materials having refractive indices between those of silicon and silicon dioxide may be selected from the materials shown in Table 1.

Although the structure in which the high-refractive-index waveguide 592 and the photodiode 528 are in close contact with each other is described in the present embodiment, the present invention is not limited to this embodiment. The silicon oxide film 530 may be interposed between the high-refractive-index waveguide 592 and the photodiode 528 as long as the thickness of the silicon oxide film 530 is small enough and no practical problem is caused by the reduction in the light transmittance from the high-refractive-index waveguide 592 to the photodiode 528.

Although no color filter is provided in the present embodiment, a color filter may also be provided to limit the wavelength range of the incident light, as in the first embodiment.

8. Modifications of Arrangement of Refractive Filters in Focus Detection Pixels According to Embodiments of the Present Invention FIGS. 18 to 21 are schematic sectional views illustrating four examples of arrangement of the low-refractive-index filter 550 and the high-refractive-index filter 560 in four focus detection pixels that collect light from the upper and lower sections of the image-pickup optical system 210 according to the embodiments of the present invention. In each of FIGS. 18 to 21, the first and third pixels from the top are the focus detection pixels that collect the light Lα from the upper section of the image-pickup optical system 210. In addition, the second and fourth pixels from the top are the focus detection pixels that collect the light Lβ from the lower section of the image-pickup optical system 210.

Figure 19:
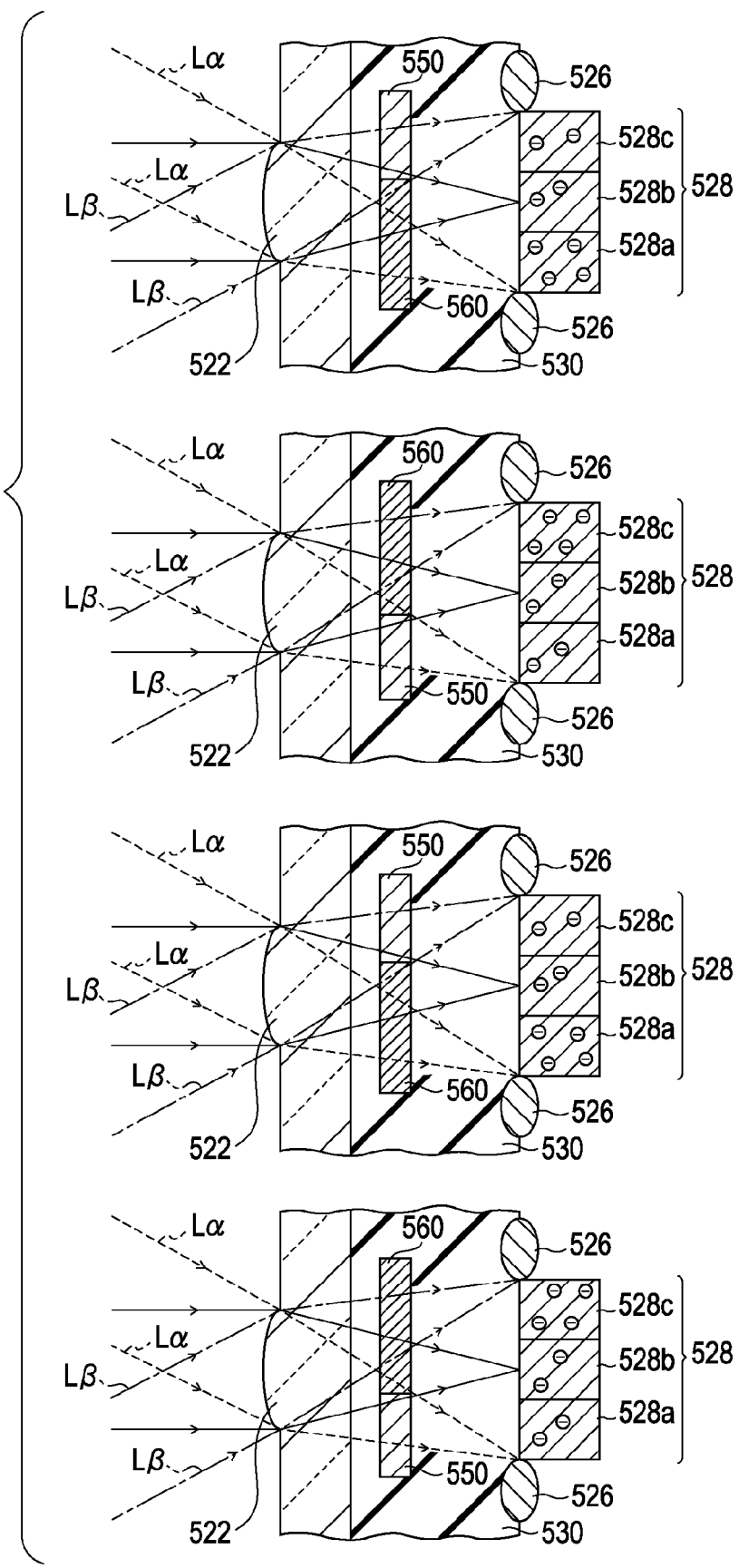
FIG. 19 is a schematic sectional view illustrating a second example of arrangement of the refractive filters in four focus detection pixels that collect light from the upper and lower sections of the image-pickup optical system according to the embodiments of the present invention.
Figure 20:
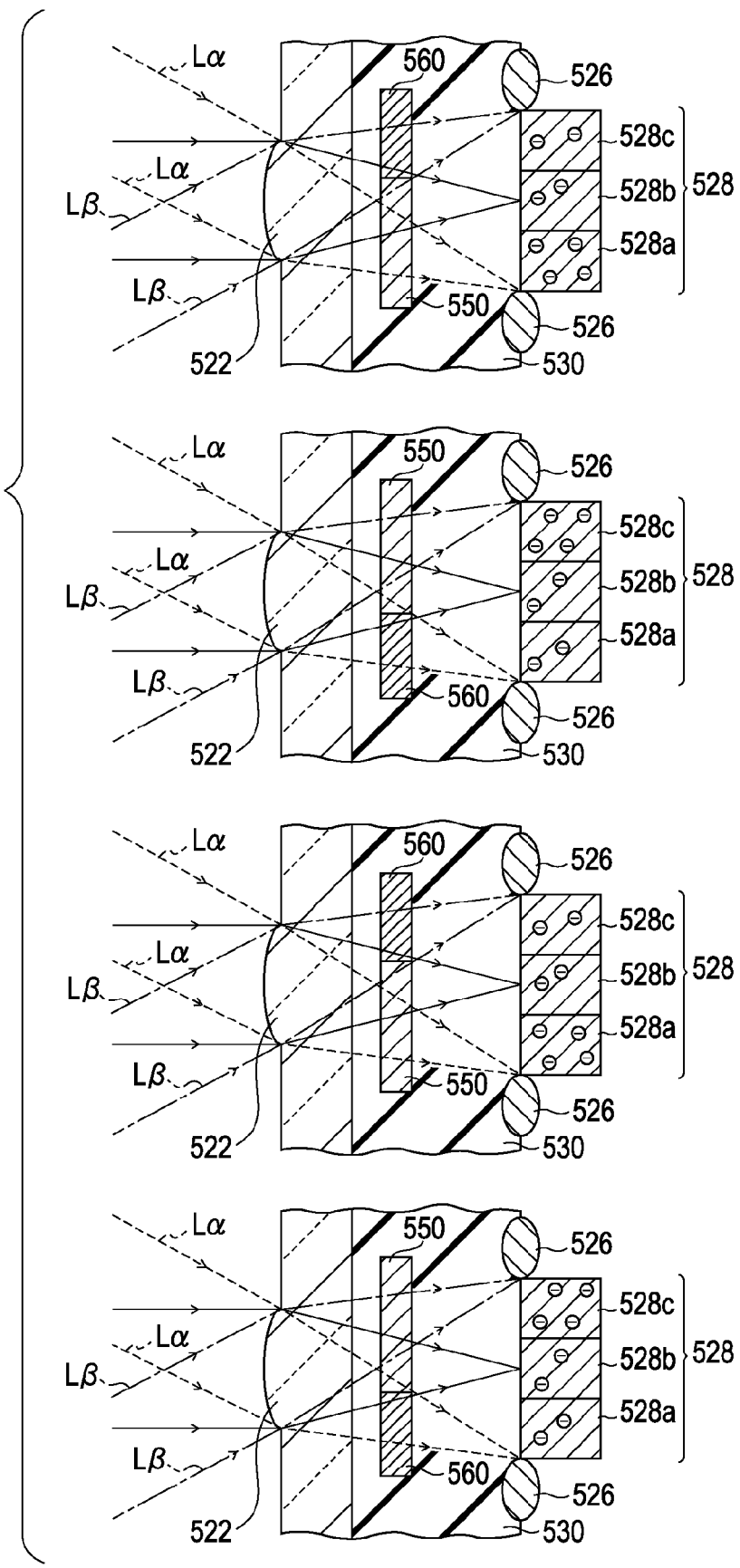
FIG. 20 is a schematic sectional view illustrating a third example of arrangement of the refractive filters in four focus detection pixels that collect light from the upper and lower sections of the image-pickup optical system according to the embodiments of the present invention.
Figure 21:
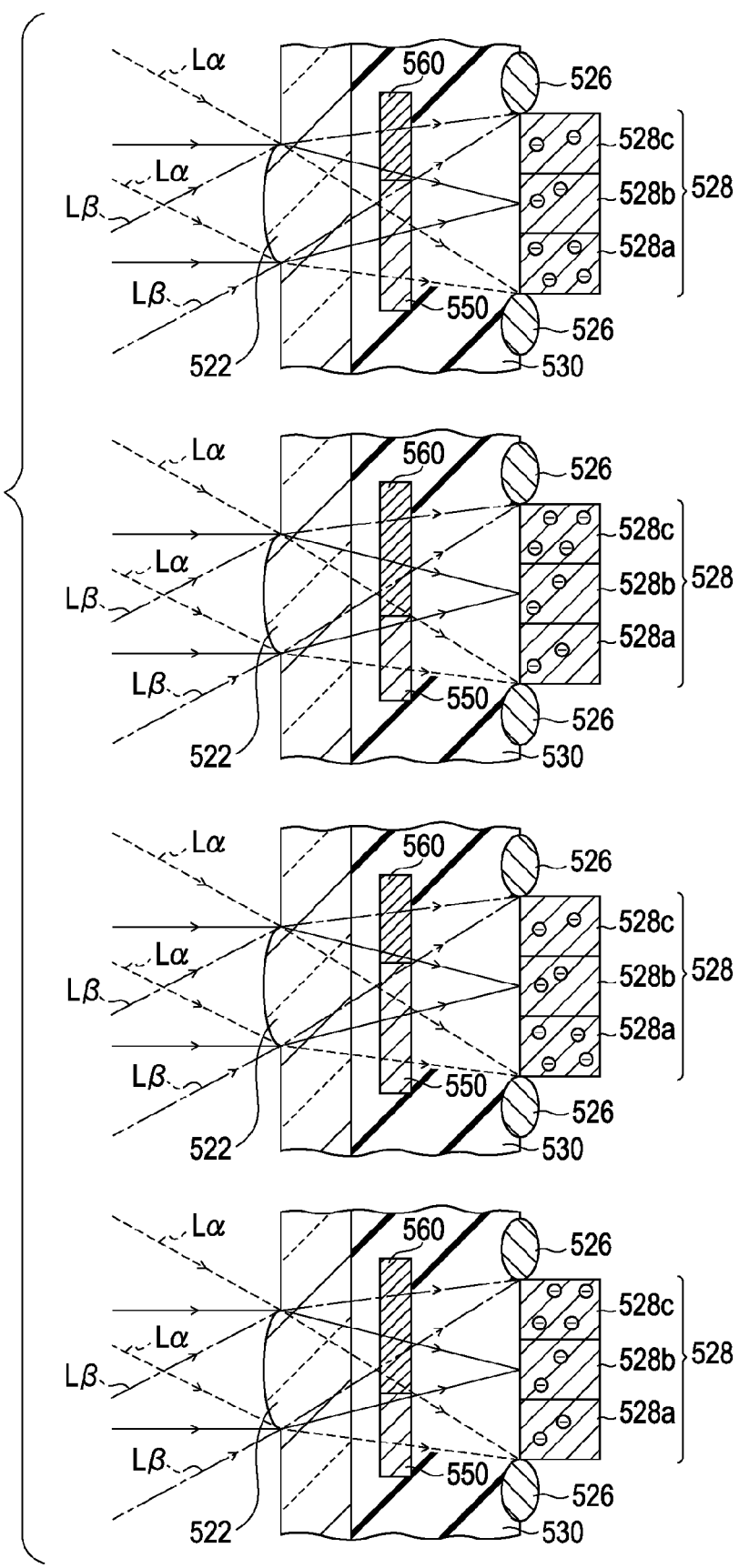
FIG. 21 is a schematic sectional view illustrating a fourth example of arrangement of the refractive filters in four focus detection pixels that collect light from the upper and lower sections of the image-pickup optical system according to the embodiments of the present invention.

In the embodiments of the present invention, two types of pixels structures may be used in the focus detection pixels that collect the light Lα from the upper section of the image-pickup optical system 210. That is, the pixel structure in which the high-refractive-index filter 560 is disposed on the lower side of the optical axis (FIGS. 18 and 19) and the pixel structure in which the low-refractive-index filter 550 is disposed on the lower side of the optical axis (FIGS. 20 and 21). This is because either of the low-refractive-index filter 550 and the high-refractive-index filter 560 may be disposed on the lower side as long as the boundary therebetween is positioned above the optical axis of the microlens 522.

Similarly, two types of pixels structures may be used in the focus detection pixels that collect the light Lβ from the lower section of the image-pickup optical system 210. That is, the pixel structure in which the low-refractive-index filter 550 is disposed on the upper side of the optical axis (FIGS. 18 and 20) and the pixel structure in which the high-refractive-index filter 560 is disposed on the upper side of the optical axis (FIGS. 19 and 21). This is because either of the low-refractive-index filter 550 and the high-refractive-index filter 560 may be disposed on the upper side as long as the boundary therebetween is positioned below the optical axis of the microlens 522.

Therefore, the number of combinations of the focus detection pixels that collect the light Lα from the upper section of the image-pickup optical system 210 and the focus detection pixels that collect the light Lβ from the lower section of the image-pickup optical system 210 can be calculated as 2×2, that is, 4. FIGS. 18 to 21 show the four kinds of arrangements.

The arrangement of the low-refractive-index filter 550 and the high-refractive-index filter 560 are preferably determined in consideration of the optical characteristics, such as the extinction coefficient. More specifically, to increase the light sensitivity of the focus detection pixels, one of the low-refractive-index filter 550 and the high-refractive-index filter 560 that is made of an optical material having a lower extinction coefficient is preferably formed so as to be opposed to the photodiode 528 over a larger area.

In addition, the light sensitivity is preferably uniform over the focus detection pixels. Therefore, it is preferable that one of the low-refractive-index filter 550 and the high-refractive-index filter 560 is formed so as to be opposed to the photodiode 528 over a larger area in all of the focus detection pixels that collect the light from the upper and lower sections of the image-pickup optical system 210. From this viewpoint, the arrangement shown in FIG. 19 in which the high-refractive-index filter 560 is formed so as to be opposed to the photodiode 528 over a larger area in all of the focus detection pixels is more preferable than the arrangement shown in FIG. 18. Similarly, the arrangement shown in FIG. 20 in which the low-refractive-index filter 550 is formed so as to be opposed to the photodiode 528 over a larger area in all of the focus detection pixels is more preferable than the arrangement shown in FIG. 21.

Figure 22:
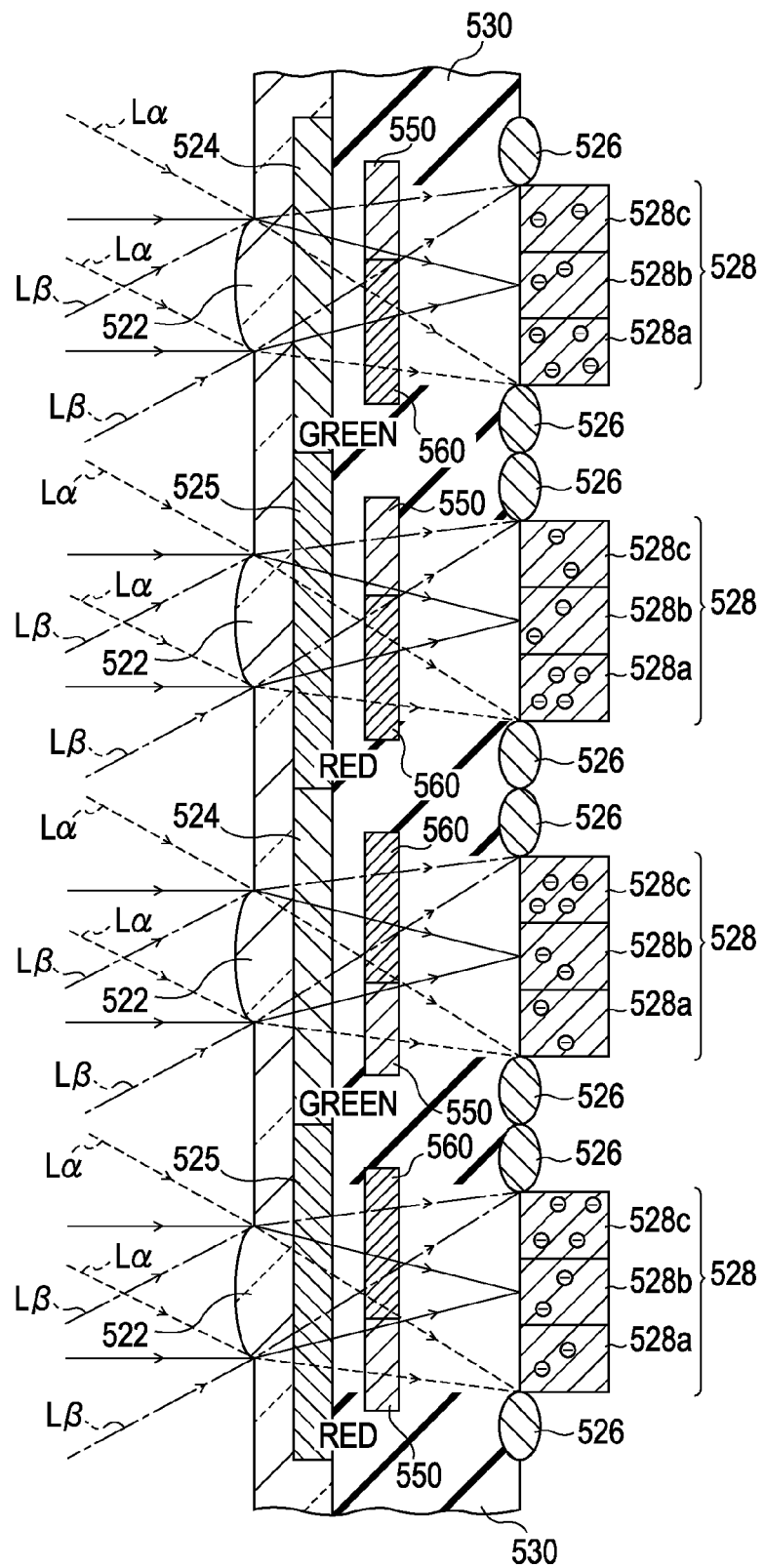
FIG. 22 is a schematic sectional view illustrating four focus detection pixels that collect light from the upper and lower sections of the image-pickup optical system in a modification of the first embodiment in which pixels that selectively transmit green light and pixels that selectively transmit red light are both used as the focus detection pixels.

9. Modification of Arrangement of Color Filters According to Embodiments of the Present Invention FIG. 22 is a schematic sectional view of four pixels that collect light from the upper and lower sections of the image-pickup optical system 210 according to a modification of the embodiments of the present invention. In FIG. 22, a color filter 205 selectively transmits red light. According to this modification, pixels that selectively transmit green light and pixels that selectively transmit red light are used as the focus detection pixels. In FIG. 22, the first and second pixels from the top are the focus detection pixels that collect the light Lα from the upper section of the image-pickup optical system 210, and the third and fourth pixels from the top are the focus detection pixels that collect the light Lβ from the lower section of the image-pickup optical system 210.

It is difficult to accurately detect the position of the focal plane on the basis of comparison between charge signals obtained from the focus detection pixels having different light-receiving wavelength ranges. Therefore, the charge signals are read from the focus detection pixels that have the same color filter (524 or 525) and that collect the light from the upper and lower sections of the image-pickup optical system 210. Then, the position of the focal plane is detected as described in the first embodiment. In FIG. 22, the position of the focal plane may be detected by reading the charge signals from the first and third focus detection pixels from the top that selectively receive green light. Alternatively, the position of the focal plane may be detected by reading the charge signals from the second and fourth focus detection pixels from the top that selectively receive red light.

While the focus detection and the focus adjustment are being performed, the image pickup device 500 is exposed to light and image data corresponding to an image to be displayed on the liquid crystal display 402 is generated. Therefore, a color distribution range of the object can be detected from the image data. Accordingly, the focus detection can be performed using the focus detection pixels that selectively receive green light if the green color component is stronger than the red color component, and the focus detection can be performed using the focus detection pixels that selectively receive red light if the red color component is stronger than the green color component. In this case, the focus detection can be accurately performed irrespective of the color distribution range of the object.

One of the color filters 524 and 525 is an example of a first optical filter described in the claims, and the other one is an example of a second optical filter described in the claims.

In the example shown in FIG. 22, the pixels that selectively receive green light and red light are used as the focus detection pixels. However, pixels that selectively receive green light and blue light may instead be used as the focus detection pixels, and the focus detection may be similarly performed in accordance with the color distribution range of the object as described above. Alternatively, pixels corresponding to three color components, that is, red, green, and blue, may be used as the focus detection pixels, and the focus detection may be performed in a similar manner.

However, when it is most important to prevent reduction in color reproducibility in consideration of the color interpolation process, it is preferable to use only the pixels corresponding to green in a Bayer pattern as the focus detection pixels, as in the first embodiment, since the number of pixels corresponding to green is twice the number of pixels of other colors.

10. Modification of Arrangement of Focus Detection Pixels According to Embodiments of the Present Invention FIG. 23 is a schematic plan view illustrating a modification of the arrangement of the focus detection pixels in the overall area of the image pickup device. In FIG. 2 which shows the first embodiment, the focus detection pixels are successively arranged with pixels for the blue light component interposed therebetween. This is simply an example of the arrangement of the focus detection pixels. As shown in FIG. 23, the intervals between the pairs of focus detection pixels that collect light from the upper and lower sections of the image-pickup optical system 210 and the intervals between the pairs of focus detection pixels that collect light from the left and right sections of the image-pickup optical system 210 may be increased.

In the case where the focus detection is performed while a moving image is displayed, the charge signals from the focus detection pixels are extracted from the charge signals from all of the pixels. Therefore, from the viewpoint of ease of the extracting process, the focus detection pixels that collect light from the upper and lower sections of the image-pickup optical system 210 are preferably arranged linearly along a pixel column (in the vertical direction). Similarly, the focus detection pixels that collect light from the left and right sections of the image-pickup optical system 210 are preferably arranged linearly along a pixel row (in the horizontal direction).

The focus detection pixels may be arranged in a cross pattern along a center pixel column and a center pixel row as shown in FIG. 23 and FIG. 2, so that the object at the center of an image space of the image-pickup optical system 210 can be easily brought into focus. This is, however, simply an example. The focus detection pixels may be disposed at positions other than the center pixel column and the center pixel row, or be disposed mainly around the pixel on the optical axis of the image-pickup optical system 210. The pixel columns or the pixel rows including the focus detection pixels may be arranged in a plurality of areas in the image pickup device 500 so that an object at desired positions of the image space of the image-pickup optical system 210 can be brought into focus. In such a case, focus detection can be performed using a pixel column or a pixel row selected from the pixel columns or the pixel rows arranged in the image pickup device 500.

Alternatively, the focus detection pixels may be arranged at positions of pixels for the red light component or the blue light component instead of the positions of pixels for the green light component in the Bayer pattern. The focus detection pixels may either be arranged next to each other or separated from each other by predetermined intervals. Alternatively, the focus detection pixels may be arranged in a staggered pattern. The arrangement of the focus detection pixels may be determined in accordance with the focus detection accuracy and the image pickup performance of the image pickup device.

The present application contains subject matter related to that disclosed in Japanese Priority Patent Application JP 2009-126818 filed in the Japan Patent Office on May 26, 2009, the entire content of which is hereby incorporated by reference.

The embodiments of the present invention are mere examples in which the present invention is embodied, and matters described in the embodiments of the present invention correspond to the matters described in the claims to define the present invention, as stated in the embodiments of the present invention. Similarly, the matters described in the claims to define the present invention correspond to the matters referred to by the same names in the embodiments of the present invention. However, the present invention is not limited to the embodiments, and various modifications may be made without departing from the scope of the present invention.

What is claimed is:

1. A focus detection apparatus, comprising:
    a plurality of first-type pixels, each first-type pixel including a photoelectric converter, a first optical member, and a second optical member, the photoelectric converter being configured to receive light from an image-pickup optical system and perform photoelectric conversion, the first and second optical members being arranged on an optical path from the image-pickup optical system to the photoelectric converter and having different refractive indices, each first-type pixel outputting a first charge signal corresponding to an amount of light received by the photoelectric converter;
    a plurality of second-type pixels, each second-type pixel including a photoelectric converter, a first optical member, and a second optical member, the photoelectric converter being configured to receive light from the image-pickup optical system and perform photoelectric conversion, the first and second optical members having different refractive indices and being arranged on an optical path from the image-pickup optical system to the photoelectric converter such that a positional relationship between the first and second optical members and the photoelectric converter in each second-type pixel differs from a positional relationship between the first and second optical members and the photoelectric converter in each first-type pixel, each second-type pixel outputting a second charge signal corresponding to an amount of light received by the photoelectric converter; and
    an image-formation-state detector configured to detect an image formation state of the image-pickup optical system on the basis of the first charge signals and the second charge signals,
    wherein,
        each of the first-type pixels further includes a first optical filter or a second optical filter on the optical path from the image-pickup optical system to the photoelectric converter, the first optical filter selectively transmitting light with a predetermined wavelength range, the second optical filter selectively transmitting light with another predetermined wavelength range, and
        each of the second-type pixels further includes the first optical filter or the second optical filter on the optical path from the image-pickup optical system to the photoelectric converter.

2. The focus detection apparatus according to claim 1, wherein:
    each of the first-type pixels and the second-type pixels further includes a light-collecting unit on the optical path from the image-pickup optical system to the photoelectric converter, the light-collecting unit collecting incident light from the image-pickup optical system on the photoelectric converter, and
    the first and second optical members are disposed between the light-collecting unit and the photoelectric converter.

3. The focus detection apparatus according to claim 2, wherein:
    the first and second optical members are arranged such that a unit including the first and second optical members is opposed to an entire body of the photoelectric converter, such that areas in which the first and second optical members are opposed to the photoelectric converter differ from each other, and such that the first and second optical members do not overlap with each other in an optical axis direction of the image-pickup optical system, and
    the first and second optical members are arranged such that a position of a boundary between the first and second optical members in each first-type pixel and a position of a boundary between the first and second optical members in each second-type pixel are at opposite sides of an axis that passes through a center of the photoelectric converter in the optical axis direction.

4. The focus detection apparatus according to claim 1, wherein each of the first-type pixels and the second-type pixels further includes a waveguide member at a position between a unit including the first optical member and the second optical member and the photoelectric converter, the waveguide member guiding incident light from the image-pickup optical system toward the photoelectric converter by reflection.

5. The focus detection apparatus according to claim 1, wherein at least one of the first and second optical members is composed of single crystal silicon, amorphous silicon, polysilicon, germanium, silicon dioxide, silicon nitride, siloxane, tungsten, aluminum, or copper.

6. The focus detection apparatus according to claim 1, wherein at least one of the first and second optical members is provided with a film made of an optical material on a surface facing the image-pickup optical system, the optical material having a reflectance that is lower than a reflectance of an inner section of the at least one of the first and second optical members.

7. A focus detection apparatus, comprising:
    a plurality of first-type pixels, each first-type pixel including a photoelectric converter configured to receive light from an image-pickup optical system and perform photoelectric conversion, a light-collecting unit configured to collect incident light from the image-pickup optical system on the photoelectric converter, and an optical layer disposed on an optical path from the image-pickup optical system to the photoelectric converter, each first-type pixel outputting a first charge signal corresponding to an amount of light received by the photoelectric converter;

a plurality of second-type pixels, each second-type pixel including a photoelectric converter configured to receive light from the image-pickup optical system and perform photoelectric conversion, a light-collecting unit configured to collect incident light from the image-pickup optical system on the photoelectric converter, and an optical layer disposed on an optical path from the image-pickup optical system to the photoelectric converter, each second-type pixel outputting a second charge signal corresponding to an amount of light received by the photoelectric converter; and an image-formation-state detector configured to detect an image formation state of the image-pickup optical system on the basis of the first charge signals and the second charge signals, wherein, each of the first-type pixels and the second-type pixels further includes an optical member having an refractive index that is different from a refractive index of the optical layer, the optical member included in each of the first-type pixels and the second-type pixels is disposed such that a peripheral edge of the optical member is separated from a straight line that passes through a center of the photoelectric converter along an optical axis direction of the image-pickup optical system and such that the optical member is opposed to only a part of the photoelectric converter, and the optical member is disposed such that a position of one end of the optical member that is close to the straight line in each of the first-type pixels and a position of one end of the optical member that is close to the straight line in each of the second-type pixels are at the opposite sides of the straight line.

8. The focus detection apparatus according to claim 7, wherein the optical member is provided with a film made of an optical material on a surface facing the image-pickup optical system, the optical material having a reflectance that is lower than a reflectance of an inner section of the optical member.

9. A focus detection apparatus, comprising:

a plurality of first-type pixels, each first-type pixel including a photoelectric converter configured to receive light from an image-pickup optical system and perform photoelectric conversion, an optical layer disposed on an optical path from the image-pickup optical system to the photoelectric converter, a first waveguide disposed in the optical layer and having a refractive index that is higher than a refractive index of the optical layer, and a second waveguide disposed adjacent to the first waveguide in the optical layer and having a refractive index that is higher than the refractive index of the first waveguide, each first-type pixel outputting a first charge signal corresponding to an amount of light received by the photoelectric converter;

a plurality of second-type pixels, each second-type pixel including a photoelectric converter configured to receive light from the image-pickup optical system and perform photoelectric conversion, an optical layer disposed on an optical path from the image-pickup optical system to the photoelectric converter, a first waveguide disposed in the optical layer and having a refractive index that is higher than a refractive index of the optical layer, and a second waveguide disposed adjacent to the first waveguide in the optical layer and having a refractive index that is higher than the refractive index of the first waveguide, the first and second waveguides disposed adjacent to each other in the optical layer such that a positional relationship between the first and second waveguides and the photoelectric converter in each second-type pixel differs from a positional relationship between the first and second waveguides and the photoelectric converter in each first-type pixel, each second-type pixel outputting a second charge signal corresponding to an amount of light received by the photoelectric converter; and an image-formation-state detector configured to detect an image formation state of the image-pickup optical system on the basis of the first charge signals and the second charge signals.

10. The focus detection apparatus according to claim 9, wherein:

each of the first-type pixels and the second-type pixels further includes a light-collecting unit on the optical path, the light-collecting unit collecting incident light from the image-pickup optical system on the photoelectric converter, and the first and second waveguides are arranged such that the positional relationship between the first and second waveguides in the first-type pixel and the positional relationship between the first and second waveguides in the second-type pixel are symmetrical to each other about an axis that passes through a center of the photoelectric converter in an optical axis direction of the image-pickup optical system.

11. An image pickup device, comprising:

a plurality of first-type pixels, each first-type pixel including a photoelectric converter, a first optical member, and a second optical member, the photoelectric converter being configured to receive light from an image-pickup optical system and perform photoelectric conversion, the first and second optical members being arranged on an optical path from the image-pickup optical system to the photoelectric converter and having different refractive indices, each first-type pixel outputting a first charge signal corresponding to an amount of light received by the photoelectric converter;

a plurality of second-type pixels, each second-type pixel including a photoelectric converter, a first optical member, and a second optical member, the photoelectric converter being configured to receive light from the image-pickup optical system and perform photoelectric conversion, the first and second optical members having different refractive indices and being arranged on an optical path from the image-pickup optical system to the photoelectric converter such that a positional relationship between the first and second optical members and the photoelectric converter in each second-type pixel differs from a positional relationship between the first and second optical members and the photoelectric converter in each first-type pixel, each second-type pixel outputting a second charge signal corresponding to an amount of light received by the photoelectric converter; and a plurality of image pickup pixels, each image pickup pixel including a photoelectric converter and outputting a third charge signal corresponding to an amount of light received by the photoelectric converter, wherein, each of the first-type pixels further includes a first optical filter or a second optical filter on the optical path from the image-pickup optical system to the photoelectric converter, the first optical filter selectively transmitting light with a predetermined wavelength range, the second optical filter selectively transmitting light with another predetermined wavelength range, and each of the second-type pixels further includes the first optical filter or the second optical filter on the optical path from the image-pickup optical system to the photoelectric converter.

12. An electronic camera, comprising:

a plurality of first-type pixels, each first-type pixel including a photoelectric converter, a first optical member, and a second optical member, the photoelectric converter being configured to receive light from an image-pickup optical system and perform photoelectric conversion, the first and second optical members being arranged on an optical path from the image-pickup optical system to the photoelectric converter and having different refractive indices, each first-type pixel outputting a first charge signal corresponding to an amount of light received by the photoelectric converter;

a plurality of second-type pixels, each second-type pixel including a photoelectric converter, a first optical member, and a second optical member, the photoelectric converter being configured to receive light from the image-pickup optical system and perform photoelectric conversion, the first and second optical members having different refractive indices and being arranged on an optical path from the image-pickup optical system to the photoelectric converter such that a positional relationship between the first and second optical members and the photoelectric converter in each second-type pixel differs from a positional relationship between the first and second optical members in each first-type pixel, each second-type pixel outputting a second charge signal corresponding to an amount of light received by the photoelectric converter;

a plurality of image pickup pixels, each image pickup pixel including a photoelectric converter and outputting a third charge signal corresponding to an amount of light received by the photoelectric converter;

a signal processor configured to generate image data on the basis of the third charge signals;

an image-formation-state detector configured to detect an image formation state of the image-pickup optical system on the basis of the first charge signals and the second charge signals; and a focus controller configured to adjust a lens position of the image-pickup optical system such that the lens position approaches an in-focus position on the basis of the image formation state determined by the image-formation-state detector, wherein, each of the first-type pixels further includes a first optical filter or a second optical filter on the optical path from the image-pickup optical system to the photoelectric converter, the first optical filter selectively transmitting light with a predetermined wavelength range, the second optical filter selectively transmitting light with another predetermined wavelength range, and each of the second-type pixels further includes the first optical filter or the second optical filter on the optical path from the image-pickup optical system to the photoelectric converter.

* * * * *